US007439918B2

(12) United States Patent
Iwai et al.

(10) Patent No.: US 7,439,918 B2
(45) Date of Patent: Oct. 21, 2008

(54) ADAPTIVE ANTENNA APPARATUS INCLUDING ADAPTIVE CONTROLLER FOR ADAPTIVE CONTROLLING AT LEAST TWO ANTENNA ELEMENTS

(75) Inventors: Hiroshi Iwai, Osaka (JP); Atsushi Yamamoto, Osaka (JP); Koichi Ogawa, Osaka (JP); Yoshio Koyanagi, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 84 days.

(21) Appl. No.: 11/294,524

(22) Filed: Dec. 6, 2005

(65) Prior Publication Data

US 2006/0232483 A1 Oct. 19, 2006

(30) Foreign Application Priority Data

Dec. 8, 2004 (JP) ............................ 2004-355255

(51) Int. Cl.
*H01Q 1/24* (2006.01)

(52) U.S. Cl. ...................................................... 343/702

(58) Field of Classification Search ................. 343/702, 343/853

See application file for complete search history.

(56) References Cited

U.S. PATENT DOCUMENTS

| | | | | |
|---|---|---|---|---|
| 5,617,102 | A | 4/1997 | Prater | 343/702 |
| 5,940,040 | A * | 8/1999 | Koyanagi et al. | 343/702 |
| 6,147,651 | A * | 11/2000 | Yamazaki et al. | 343/702 |
| 6,806,844 | B2 * | 10/2004 | Azuma | 343/853 |
| 6,888,504 | B2 * | 5/2005 | Chiang et al. | 343/702 |
| 6,924,766 | B2 * | 8/2005 | Tran | 343/702 |
| 2003/0189518 | A1 | 10/2003 | Johnson et al. | 343/702 |

FOREIGN PATENT DOCUMENTS

| | | |
|---|---|---|
| JP | 61-227404 | 10/1986 |
| JP | 8-251099 | 9/1996 |
| JP | 8-288895 | 11/1996 |
| JP | 9-247031 | 9/1997 |

(Continued)

OTHER PUBLICATIONS

International Search Report issued Jun. 13, 2007 in the International (PCT) Application of which the present application is the U.S. National Stage.

(Continued)

*Primary Examiner*—Trinh Vo Dinh
*Assistant Examiner*—Dieu Hien T Duong
(74) *Attorney, Agent, or Firm*—Wenderoth, Lind & Ponack, L.L.P.

(57) ABSTRACT

An adaptive antenna apparatus includes antenna elements. One of the antenna elements has an electrical length L1 larger than λ/2, and equal to or smaller than a predetermined upper-limit wavelength, where λ is a wavelength of a radio signal. Another antenna element has an electrical length L2 equal to or larger than a predetermined lower-limit wavelength and equal to or smaller than λ/2. A controller adaptive-controls the adaptive antenna apparatus to form a radiation pattern of the adaptive antenna apparatus including a plurality of nulls substantively in a direction of an interference wave by adjusting at least one of an amplitude and a phase of each radio signal received by the first and second antenna elements.

17 Claims, 21 Drawing Sheets

FOREIGN PATENT DOCUMENTS

| | | |
|---|---|---|
| JP | 10-242739 | 9/1998 |
| JP | 11-215022 | 8/1999 |
| JP | 11-284424 | 10/1999 |
| JP | 2001-111326 | 4/2001 |
| JP | 2001-313525 | 11/2001 |

OTHER PUBLICATIONS

International Preliminary Examination Report issued in PCT/JP2005/022377, Form PCT/IB/373, Form PCT/ISA/237, date of mailing Jun. 21, 2007.

* cited by examiner

ADAPTIVE ANTENNA APPARATUS INCLUDING ADAPTIVE CONTROLLER FOR ADAPTIVE CONTROLLING AT LEAST TWO ANTENNA ELEMENTS

BACKGROUND OF THE INVENTION

1. Field of the Invention

The present invention relates to an adaptive antenna apparatus for mobile communication mainly for use in a communication equipment such as a mobile telephone or a radio communication apparatus. In particular, the present invention relates to an adaptive antenna apparatus including an adaptive controller for adaptively controlling at least two antenna elements.

2. Description of the Related Art

In recent years, mobile radio communication apparatuses such as mobile telephones have been rapidly downsized and thinned. Further, the mobile radio communication apparatuses are not only used as conventional telephones, but have also been transformed into data terminal devices for transmitting and receiving electronic mail and browsing websites on the WWW (World Wide Web). A volume of information handled by the mobile radio communication apparatus, which conventionally used to include audio and characters, now contains photographs and moving images therein resulting in a large capacity. Thus, a further improved quality is demanded in the communications. Under the circumstances, it has been proposed to adopt an adaptive antenna apparatus in a mobile terminal, whose main purpose is conventionally to increase a performance of an antenna in a base station (for example, See Japanese Patent Laid-Open Publication No. 11-284424, which is hereinafter referred to as a Patent Document 1).

FIG. 17 is a block diagram showing a configuration of an antenna apparatus for use in a mobile terminal according to a first prior art, which is disclosed in the Patent Document 1. The first prior art is directed to resolve problems such as electric power being converted into heat and being transmitted onto a head part of a human body, which fails to contribute to the communication to be unnecessary, and a reception characteristic deteriorates since delay waves interfere with each other. To this end, the first prior art is provided with an electrically conductive housing 71, a plurality of antenna elements 72, a transmission and reception circuit 73, and an amplitude and phase adjusting circuit 74 for decreasing the electric power radiated onto the head of the human body by adjusting the amplitudes and the phases of the antenna elements 72. According to the configuration, the electric power radiated onto the head part of the human body is reduced at the time of the transmission, and signals transmitted to the antenna elements 72 can be efficiently radiated into a space. On the other hand, the efficiency can be effectively improved since an antenna directivity in any direction other than that toward the human body can be increased in the absence of the directivity toward the human body with respect to the mobile terminal at the time of the reception.

There is another proposed configuration where nulls of the directivity are directed in directions of the delay waves of interference waves, in order to eliminate the interfering delay waves (for example, See Japanese Patent Laid-Open Publication No. 10-242739, which is hereinafter referred to as a Patent Document 2). FIG. 18 is a block diagram showing a configuration of a base station antenna apparatus for a mobile communication according to a second prior art disclosed in the Patent Document 2. In the second prior art, the base station antenna apparatus for the mobile communication is constituted as follows in order to prevent the interference of the delay waves and reduce the number of the antenna elements in the case of employing an array configuration to realize a pencil-shaped beam. The second prior art relates to the base station antenna apparatus for use in the mobile communication which radiates a strip-shaped region, where a plurality of antenna elements 81 are linearly arranged to be perpendicular to the longitudinal direction of the strip-shaped region, and the parameters of the antenna elements 81 are set as follows. The antenna elements 81 has a number of elements, which is equal to or larger than two elements, and is equal to or smaller than five elements, and an interval S between the antenna elements 81 is set to equal to or larger than one wavelength, and is equal to or smaller than three wavelengths. In addition, amplitude and phase changing devices 83 for changing the amplitudes and phases of signals inputted from the antenna elements 81 via frequency converters 82 are provided in respective antenna input units. Further, an amplitude and phase calculator 84 calculates the amplitudes and phases of the respective antenna input signals so that an error between a signal previously known on the reception, and a combined signal of the signals received at the antenna elements 81 is minimized. Then, the amplitude and phase calculator 84 adjusts the respective amplitude and phase changing devices 83 so that the amplitudes and the phases of the respective antenna elements 81 calculated by the amplitude and phase calculator 84 can be outputted from the amplitude and phase changing devices 83.

In the antenna apparatuses according to the prior arts, omni-directional antenna elements are mainly used. Therefore, the degree of freedom of the antenna elements corresponding to the number of the formed nulls in a radiation pattern is only $N-1$ when the number of the provided antenna elements is N larger than one. Therefore, a problem has been caused that a larger number of antenna elements are required for the antenna apparatuses in order to direct the nulls toward the human body and the interference waves.

SUMMARY OF THE INVENTION

An object of the present invention is to solve the foregoing problems, and to provide an adaptive antenna apparatus capable of forming a plurality of nulls in a radiation pattern with a number of antenna elements smaller than that of the prior arts, and a radio communication apparatus employing the adaptive antenna apparatus.

According to a first aspect of the present invention, there is provided an adaptive antenna apparatus comprising at least two antenna elements, which includes first and second antenna elements. The first antenna element has an electrical length L1 larger than $\lambda/2$ and equal to or smaller than a predetermined upper-limit wavelength, where $\lambda$ is a wavelength of a radio signal. The second antenna element has an electrical length L2 equal to or larger than a predetermined lower-limit wavelength and equal to or smaller than $\lambda/2$. The adaptive antenna apparatus further includes a controller for adaptively controlling the adaptive antenna apparatus to form a radiation pattern of the adaptive antenna apparatus including a plurality of nulls substantively in a direction of an interference wave by adjusting at least one of an amplitude and a phase of each radio signal received by the first and second antenna elements.

The above-mentioned adaptive antenna apparatus includes at least three antenna elements, which include at least two first antenna elements, and the second antenna element. The first antenna elements respectively have electrical lengths L1 and L1', each larger than $\lambda/2$ and equal to and smaller than the predetermined upper-limit wavelength. The electrical lengths L1 and L1' are either different from or equal to each other.

In addition, the above-mentioned adaptive antenna apparatus includes at least three antenna elements, which include the first antenna element, and at least two second antenna elements. The second antenna elements respectively have electrical lengths L2 and L2', each equal to or larger than the predetermined lower-limit wavelength and equal to or smaller than λ/2. The electrical lengths L2 and L2' are either different from or equal to each other.

According to a second aspect of the present invention, there is provided an adaptive antenna apparatus including at least three first antenna elements, and a controller. The first antenna elements respectively have electrical lengths L1, L1' and L1" larger than λ/2 and equal to or smaller than a predetermined upper-limit wavelength, where λ is a wavelength of a radio signal. The controller adaptively controls the adaptive antenna apparatus to form a radiation pattern of the adaptive antenna apparatus including a plurality of nulls substantively in a direction of an interference wave by adjusting at least one of an amplitude and a phase of each radio signal received by the respective first antenna elements. At least two of the electrical lengths L1, L1' and L1" are different from each other.

In the above-mentioned adaptive antenna apparatus, the lower-limit wavelength is one of λ/4, λ/8, and λ/16. In addition, in the above-mentioned adaptive antenna apparatus, the upper-limit wavelength is one of 10λ, 3λ, and λ.

In addition, in the above-mentioned adaptive antenna apparatus, the antenna elements are one of an unbalanced antenna and a balanced antenna.

Further, in the above-mentioned adaptive antenna apparatus, at least one of the antenna elements is a plate-shaped inverted-F antenna.

Still further, in the above-mentioned adaptive antenna apparatus, at least one of the antenna elements is such an antenna element that at least one part of a housing of the adaptive antenna apparatus is formed of an electrically conductive material.

Still further, in the above-mentioned adaptive antenna apparatus, the controller compares a signal quality level of a radio signal which is adaptively controlled by the plurality of antenna elements, with signal quality levels of radio signals which are received separately by the respective antenna elements without any adaptive control, thereby controlling the adaptive antenna apparatus to set an optimal signal quality level.

According to a third aspect of the present invention, there is provided a radio communication apparatus including the adaptive antenna apparatus, and a radio communication circuit for transmitting and receiving a radio signal received by the adaptive antenna apparatus.

According to the present invention, there can be provided an adaptive antenna apparatus having a number of antenna elements smaller than that of the prior arts, the antenna elements being capable of forming a plurality of nulls in a projection pattern the antenna elements can be provided in a radio communication apparatus using the same adaptive antenna apparatus.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Hereinafter, preferred embodiments of the present invention are described with reference to the drawings. In all these drawings, components similar to each other are indicated by the same numerical references.

First Preferred Embodiment

Figure 1:
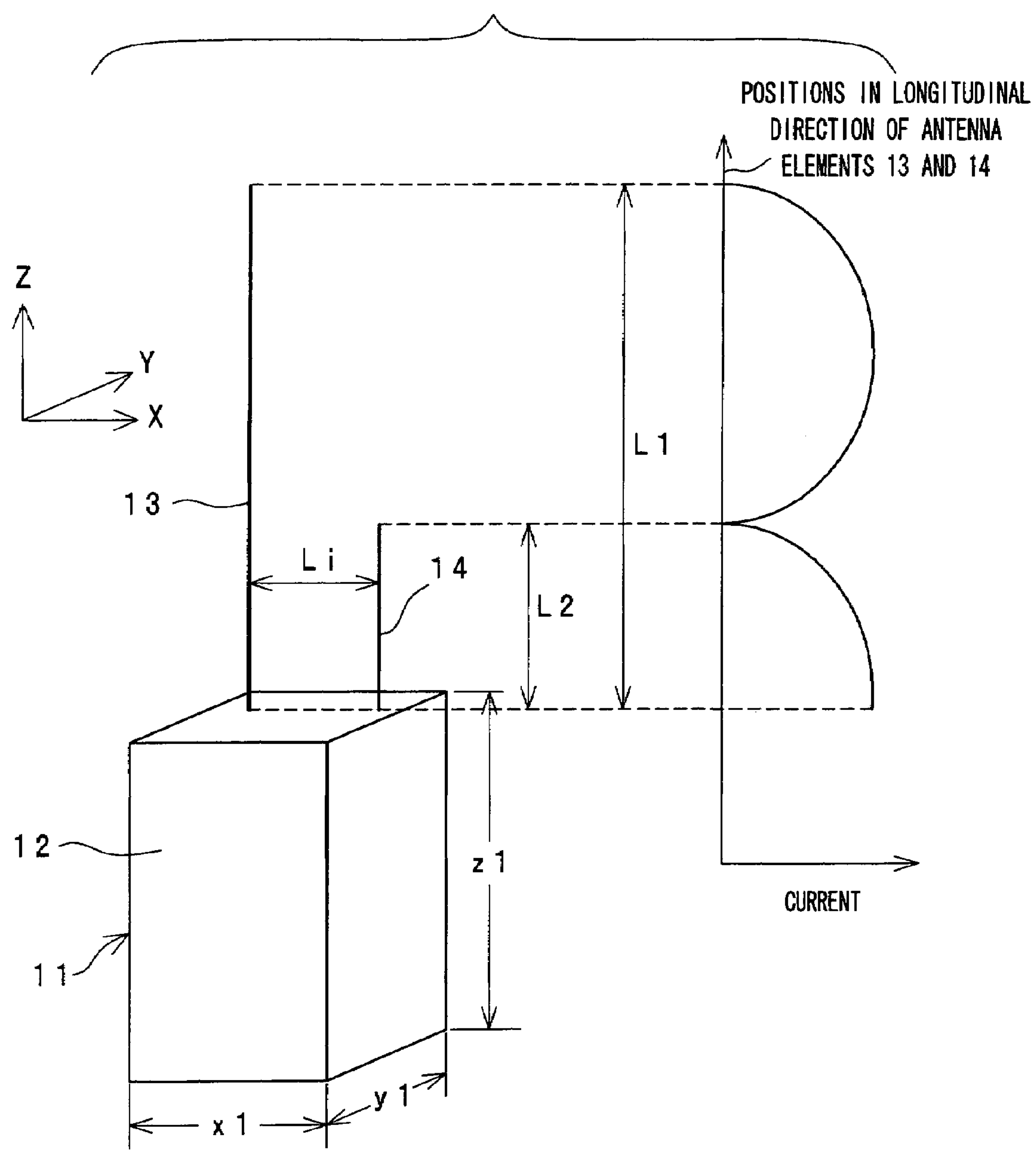
FIG. 1 is a perspective view showing a configuration of a radio communication apparatus 11 including an adaptive antenna apparatus according to a first preferred embodiment of the present invention, and a current distribution with respect to positions in a longitudinal direction of antenna elements 13 and 14.
Figure 2:
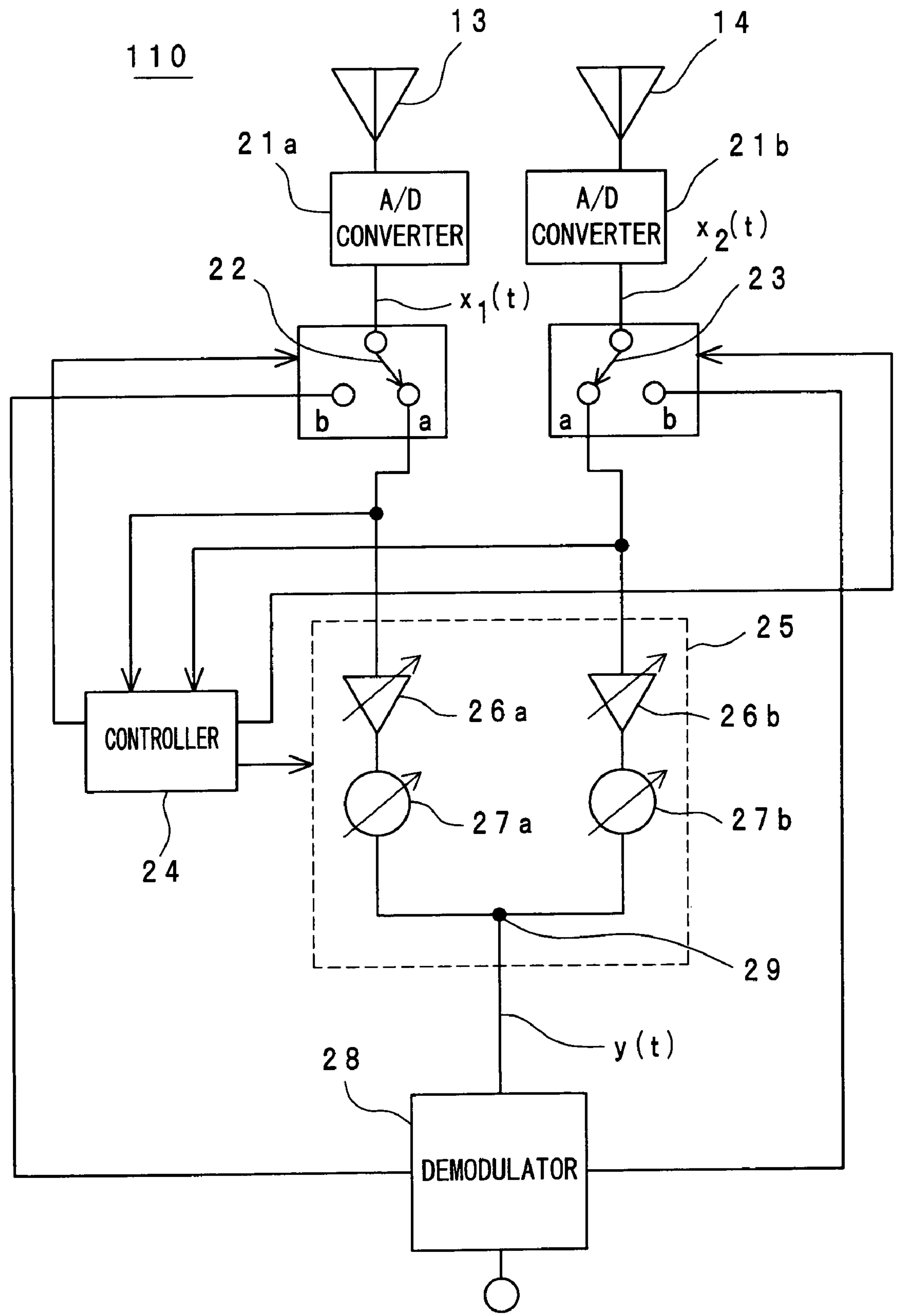
FIG. 2 is a block diagram showing a configuration of a radio communication circuit 110 of the radio communication apparatus 11 shown in FIG. 1.

FIG. 1 is a perspective view showing a configuration of a radio communication apparatus 11 including an adaptive antenna apparatus according to a first preferred embodiment of the present invention, and a current distribution with respect to positions in a longitudinal direction of antenna elements 13 and 14. FIG. 2 is a block diagram showing a configuration of a radio communication circuit 110 of the radio communication apparatus 11 shown in FIG. 1. In FIG. 1, a X-Y-Z three-dimensional coordinate system, in which a width direction of the radio communication apparatus 11 is an X-axis direction, a thickness direction thereof is a Y-axis direction, and a length direction thereof is a Z-axis direction, is used in order to describe the configuration of the radio communication apparatus 11 and a radiation pattern radiated therefrom.

In the adaptive antenna apparatus shown in FIG. 1, two antenna elements 13 and 14 are provided on the housing 12 of the radio communication apparatus 11 so that the antenna elements 13 and 14 are distant from each other by a predetermined interval Li, and longitudinal directions of the antenna elements 13 and 14 are in parallel to each other and also in parallel to a longitudinal direction of the housing 12. The antenna elements 13 and 14 are vertically provided so that they are electrically insulated from the housing 12. The interval Li is preferably set to (½)λ (where λ is a wavelength of a radio signal which is transmitted and received for a radio communication), and may be set to an interval below (½)λ, for example, (¼)λ, in view of the size of the housing 12. The housing 12 has a width of x1, a thickness of y1 and a length of z1, and is formed of an electrically conductive metal material. The housing 12 contains therein the radio communication circuit 110 shown in FIG. 2. The antenna element 13 has a length of Li, and an electrical length thereof is approximately (¾)λ. The antenna element 14 has a length of L2, and an electrical length thereof is approximately (¼)λ. When the antenna elements 13 and 14 are, for example, monopole antennas having a linear shape, L1=approximately (¾)λ, and L2=approximately (¼)λ.

The following describes an operation of a general adaptive antenna apparatus. The adaptive antenna apparatus adopts a technology for realizing a stable radio communication in such a manner that the radiation pattern is maximized in a direction where a desired wave arrives, and a null of the radiation pattern is directed toward an interference wave which obstructs the radio communication. In general, the adaptive antenna apparatus includes an amplitude adjusting circuit and a phase shifter for each antenna element, and gives an amplitude difference and a phase difference between the antennas to realize the maximized desired signal power and a minimized interference signal power. When the signal is received via the antenna element, a thermal noise component is generally received together with a signal of a desired wave. Further, there is also a risk of receiving the interference waves through an identical channel and at an identical frequency from any adjacent base station and the delay waves which are originally the desired wave but include time delays since they arrive via a large path. The delay wave deteriorates a quality of a screen display similar to, for example, a false image in analog radio receivers such as a television receiver and a radio receiver. In a digital radio receiver, the thermal noise, the interference waves and delay waves through the identical channel all influence bit error in the received digital data, and directly deteriorate a signal quality level of the digital data. Provided that an electric power of the desired waved is C, the electric power of the thermal noise is N, and the electric power of the interference waves including the interference wave and delay wave through the identical channel is I, the adaptive antenna apparatus operates to, for example, maximize an evaluation function C/(N+1) so that the signal quality level is improved. As a result, an adaptive control can be done such that a main-beam direction formed by the adaptive antenna apparatus can be directed substantively in the direction of the desired wave, and the nulls directed substantively in the direction of the interference wave.

Next, a circuit configuration and an operation of the radio communication circuit 110 of the adaptive antenna apparatus shown in FIG. 1 are more concretely described below with reference to FIG. 2.

Upon execution of the adaptive control, switches 22 and 23 are respectively switched over to a contact "a" by a controller 24. The radio signals respectively received by the antenna elements 13 and 14 are inputted to analog to digital converters (hereinafter, referred to as an A/D converters) 21*a* and 21*b* including a high frequency amplifier, an intermediate frequency converter and the like. The respective A/D converters 21*a* and 21*b* convert the radio signals into a digital signal x (t) (where x (t) is a signal vector, consisting of a digital signal x1 (*t*) outputted from the A/D converter 21*a*, and a digital signal x2 (*t*) outputted from the A/D converter 21*b*, namely, x (t) has two signal elements), and outputs the converted signal to the controller 24 via the switches 22 and 23 and further outputs the same converted signal to an adaptive control circuit 25.

The adaptive control circuit 25 includes an amplitude adjusting circuit 26*a* for adjusting an amplitude of the digital signal x1 (*t*) such as a variable amplifier, a phase shifter 27*a* for adjusting a phase of the digital signal x1 (*t*), an amplitude adjusting circuit 26*b* for adjusting an amplitude of the digital signal x2 (*t*) such as a variable amplifier, and a phase shifter 27*b* for adjusting a phase of the digital signal x2 (*t*). The digital signal x1 (*t*) is outputted to a signal combiner 29 via the amplitude adjusting circuit 26*a* and the phase shifter 27*a*. On the other hand, the digital signal x2 (*t*) is outputted to the signal combiner 29 via the amplitude adjusting circuit 26*b* and the phase shifter 27*b*. The signal combiner 29 combines the inputted two digital signals, and outputs a digital signal y (t) of a combining result to a demodulator 28. The demodulator 28 demodulates the inputted digital signal y (t) into a digital data signal by means of a demodulation method corresponding to a demodulation method on the transmission and outputs the demodulated signal.

According to the present preferred embodiment, the controller 24 determines such a weighting coefficient "wi" including respective amplitude amounts Ai of the amplitude adjusting circuits 26*a* and 26*b* and respective phase shifting amounts ϕi of the phase shifters 27*a* and 27*b* (i=1, 2; where i=1 denotes a processing system of the digital signal x1 (*t*), and i=2 denotes a processing system of the digital signal x2 (*t*)), that the digital signal y (t) from the adaptive control circuit 25 can have the highest signal quality level by means of, for example, an adaptive control method as described in detail later to control the amplitude adjusting circuits 26*a* and 26*b* and the phase shifters 27*a* and 27*b*. As a result, the demodulated signal outputted from the demodulator 28 can have an optimum signal quality level. The following describes a specific example of the adaptive control method using the adaptive control circuit 25. The weighting coefficients wi are expressed by the following equation based on the amplitude amount Ai and the phase shifting amount ϕi:

$$wi = Ai \cdot \exp(j\omega\phi i),\ (i=1, 2) \quad (1).$$

In the foregoing equation, j denotes an imaginary unit, and c is an angular frequency of the received radio signal, where ω=2πf (f is a frequency of the radio signal). The following describes a method of obtaining optimal weighting coefficients by defining the weighting coefficient vector "w" whose elements are wi (i=1, 2).

Among the several available methods of obtaining the weighting coefficients, an example in which the steepest descent method (LMS: Least Means Squares) is employed is shown below. In the present method, the adaptive antenna apparatus possesses a signal sequence r (t) included in the previously known desired wave (for example, a reference signal transmitted prior to a data signal to be transmitted, hereinafter, referred to as a reference signal), and executes its control operation so that the signal sequence included in the received radio signal approaches the predetermined reference signal. In the shown example, the reference signal is retained in the controller 24. More concretely, the controller 24 multiplies the received digital signal x (t) by the weighting coefficient w (t) calculated by the adaptive control method described above, and calculates a residual error "e (t)" between a result of the multiplication and the reference signal r (t) by using the following equation:

$$e(t) = r(t) - w(t) \times x(t) \quad (2).$$

The residual error "e (t)" can be a positive or negative value. Therefore, the minimum value of a square value of the residual error "e (t)" calculated by the equation (2) is obtained by repeating a recurrence calculating method. In other words, the weighting coefficients w (t, m+1) calculated by means of the (m+1)-th repetitive calculating method can be calculated using the following equation based on the m-th weighting coefficient w (t,m):

$$w(t,m+1) = w(t,m) + u \times x(t) \times e(t,m) \quad (3).$$

In this case, "u" in the foregoing equation is referred to as a step size. As the step size "u" increases, the number of times when the repetitive calculating method is implemented so that the weighting coefficient w (t,m+1) converges into the minimum value is advantageously reduced. However, when the step size "u" becomes too large, the weighting coefficient vibrates disadvantageously near the minimum value of the weighting coefficient w (t,m+1). Therefore, it is necessary to pay full attention to the selection of the step size "u" using a control system. On the contrary, when the step size "u" is reduced, the weighting coefficient w (t,m+1) is stabilized so as to converge into the minimum value thereof. However, this leads to increase in the number of repetitive calculations to be implemented. The increased number of repetitive calculations unfavorably results in that it takes a remarkable long time to calculate the weighting coefficients. If the time required for calculating the weighting coefficients is smaller than a changing time in the surrounding environment (for example, a few milliseconds), it becomes impossible to improve the signal quality level based on the weighting coefficients. Therefore, it is necessary to select conditions under which a higher speed is ensured and the minimum value is stably obtained in order to determine the step size "u". The residual error "e (t,m)" is defined by the following equation:

$$e(t,m) = r(t) - w(t,m) \times x(t) \quad (4).$$

The residual error e (t,m) calculated by means of the foregoing equation (4) is used to recurrently renew or update the weighting coefficients w (t,m+1) as calculated by the equation (3). The maximum number of times when the repetitive calculating method for calculating an optimum weighting coefficient w (t,m+1) is implemented is set so that the calculating time for the weighting coefficient is not smaller than the time for switching over between the radio systems. In the above description, although the method of judging the radio communication system based on the steepest descent method is explained, the present invention is not limited to thereto. For example, the RLS (Recursive Least-Squares) method or the SMI (Sample Matrix Inversion) method, which are capable of more speedily making the judgment, may be employed. While these methods accelerate the judgment process, these methods also make the calculation in the judgment unit complicated. As another example, the CMA (Constant Modulus Algorithm) method may be employed in the case where the modulation method for the signal sequence is a constant envelope modulation having a constant envelope such as a digital phase modulation.

Next, upon not executing the adaptive control (hereinafter, referred to as a non-adaptive control), the switches 22 and 23 are respectively switched over to a contact "b" by the controller 24. Accordingly, the received digital signals x1 (*t*) and x2 (*t*) respectively outputted from the A/D converters 21*a* and 21*b* are outputted to the demodulator 28 via the switches 22 and 23. The demodulator 28 demodulates the inputted digital signals x1 (*t*) and x2 (*t*) into the digital data signals, and preferably selects and outputs, from the two demodulated digital data signals, the digital data signal having a smaller bit error than that of the other digital data signal.

In the adaptive antenna apparatus operating as described, the signal quality levels of the digital data signals demodulated by the adaptive control and the signal quality levels of the two digital data signals by the non-adaptive control are compared with one another so that the digital data signal having the highest signal quality level is selected and outputted. As a result, the most stable and highest signal quality level can be obtained, and consumption current in the radio communication circuit 110 can be reduced when the non-adaptive control operation is selected when the interference wave has a relatively small level.

Next, in the adaptive antenna apparatus according to the first preferred embodiment, the simulations are implemented to study changes in the radiation pattern when the element lengths L1 and L2 of the antenna elements 13 and 14 are variously changed, and results of the simulations are examined below. In the simulations, two dipole antennas 13A and 14A shown in FIG. 3, which are balanced antennas, are used in place of the monopole antennas shown in FIG. 1, which are unbalanced antennas. The dipole antenna 13A includes two antenna elements 13*a* and 13*b*, and the dipole antenna 14A includes two antenna elements 14*a* and 14*b*. These two dipole antennas 13A and 14A are disposed so that they are distant from each other by an interval (½)λ and the antenna elements 13*a* and 13*b* are in parallel to the antenna elements 14*a* and 14*b*, respectively. The two dipole antennas 13A and 14A are used in place of the two monopole antennas in the simulations since the dipole antennas 13A and 14A and the monopole antennas operate based on the same operation mechanism, and the simulations can be facilitated when the dipole antennas 13A and 14A are used. The dipole antennas 13A and 14A are equivalent to the two antenna elements of the monopole antennas when radio signals are fed in reverse phase, and one half of the total length of the dipole antennas 13A and 14A corresponds to the element length of the monopole antenna. When the monopole antenna is analyzed, an imaginary monopole antenna is virtually formed on the ground plate with a feeding point as a boundary in the simulation, and this corresponds to the dipole antenna.

Figure 3:
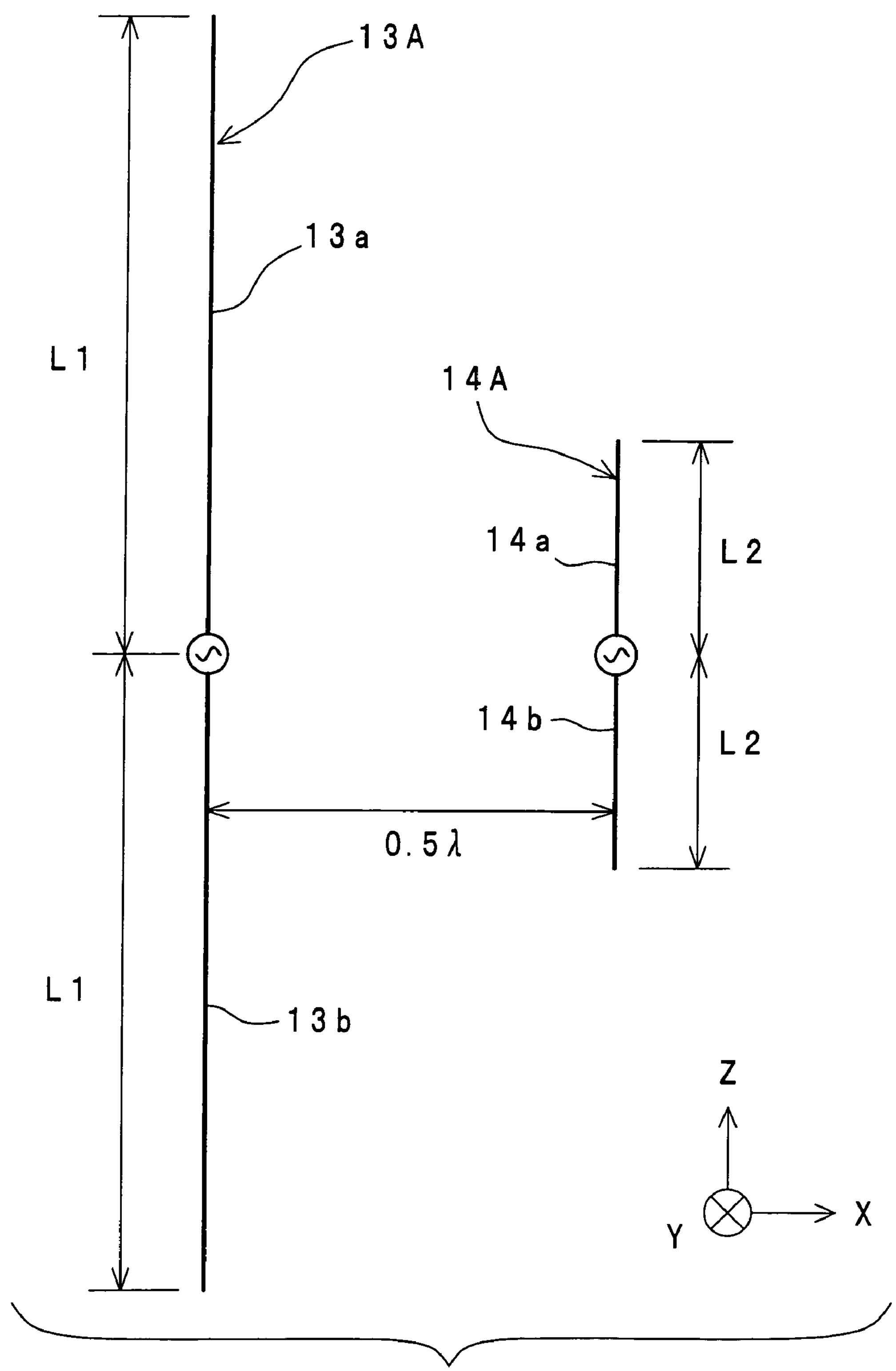
FIG. 3 is a plan view showing an implemental example of an adaptive antenna apparatus in which the antenna elements 13 and 14 of the adaptive antenna apparatus shown in FIG. 1 are respectively replaced with dipole antennas 13A and 14A.
Figure 4:
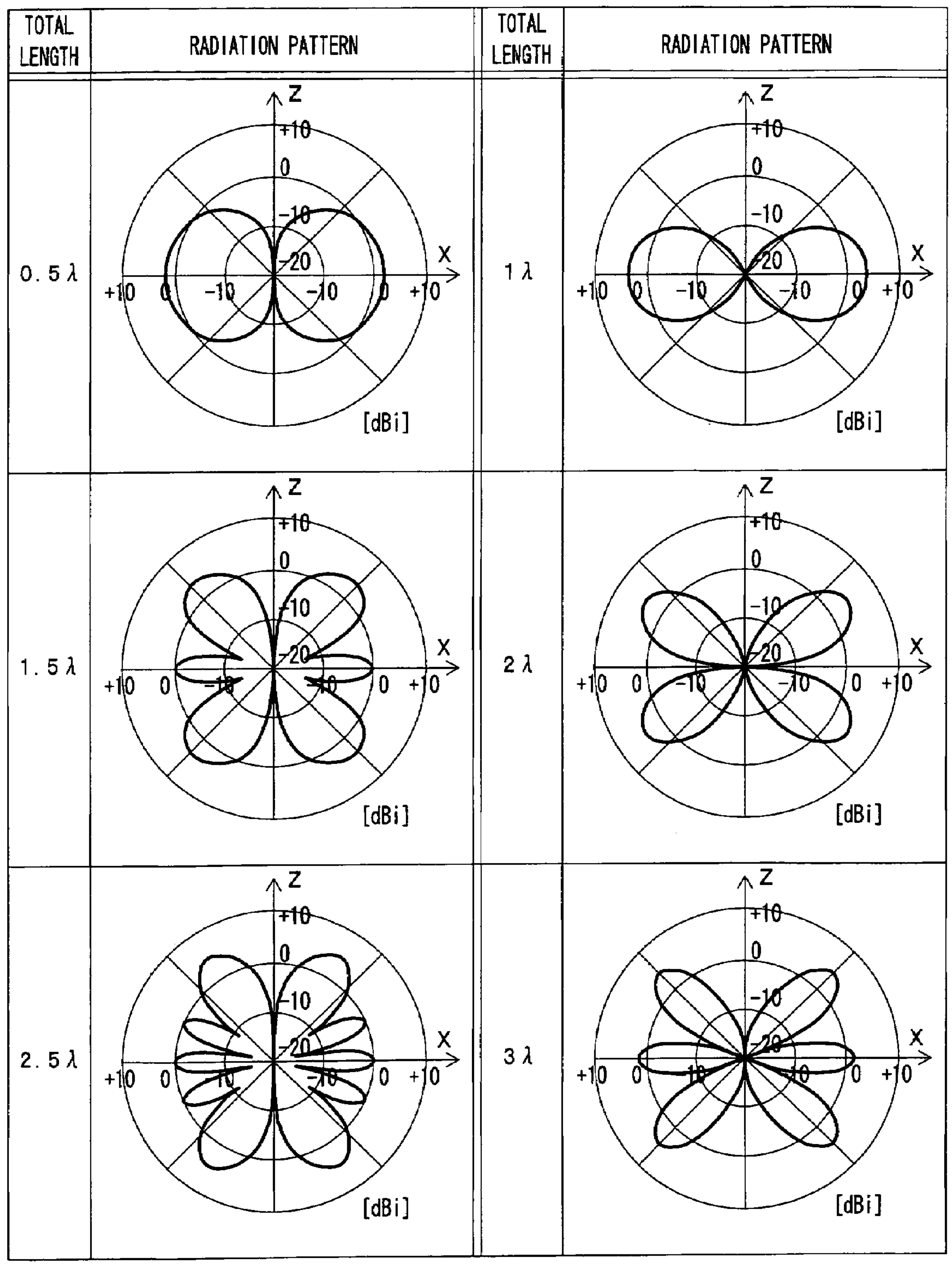
FIG. 4 shows simulation results of the adaptive antenna apparatus shown in FIG. 3, showing changes in a radiation pattern when a total length of the dipole antenna is changed.

FIG. 4 shows simulation results of the adaptive antenna apparatus shown in FIG. 3, where the changes in the radiation pattern when the total length of the dipole antenna is variously changed are shown. FIG. 4 shows the changes in the radiation pattern on the Z-X plane (radiation pattern on the vertical plane) when the total length of one of the dipole antenna (13A or 14A) is changed, showing the changes when the total length is changed in the range of six different values, 0.5λ, 1λ, 1.5λ, 2λ, 2.5λ and 3λ. These cases respectively correspond to cases where the element lengths of the dipole antenna are 0.25λ, 0.5λ, 0.75λ, 1λ, 1.25λ, and 1.5λ. As is apparent from FIG. 4, the radiation pattern has a figure-8 characteristic when the total length of the dipole antenna is equal to or smaller than 1λ, and a plurality of nulls are generated when the total length is larger than 1λ because the current direction on the antenna element is reversed every 0.5λ. In the case of the monopole antenna, the plurality of nulls can be generated when the element length exceeds 0.5λ.

Referring to FIG. 4, the figure-8 characteristic is shown when the total length of the dipole antenna is 0.5λ, and the nulls are generated in +Z and −Z directions, and this corresponds to a theoretical assumption (hereinafter, referred to as nulls in Z-axis direction). When the total length is 1.5λ, two nulls are generated in the right half of the Z-X plane, and the other two nulls are generated in the left half of the plane in addition to the nulls in the Z-axis direction. When the total length is 2.5λ, four nulls are generated in the right half of the Z-X plane, and the other four nulls in the left half of the plane in addition to the nulls in the Z-axis direction.

Figure 8:
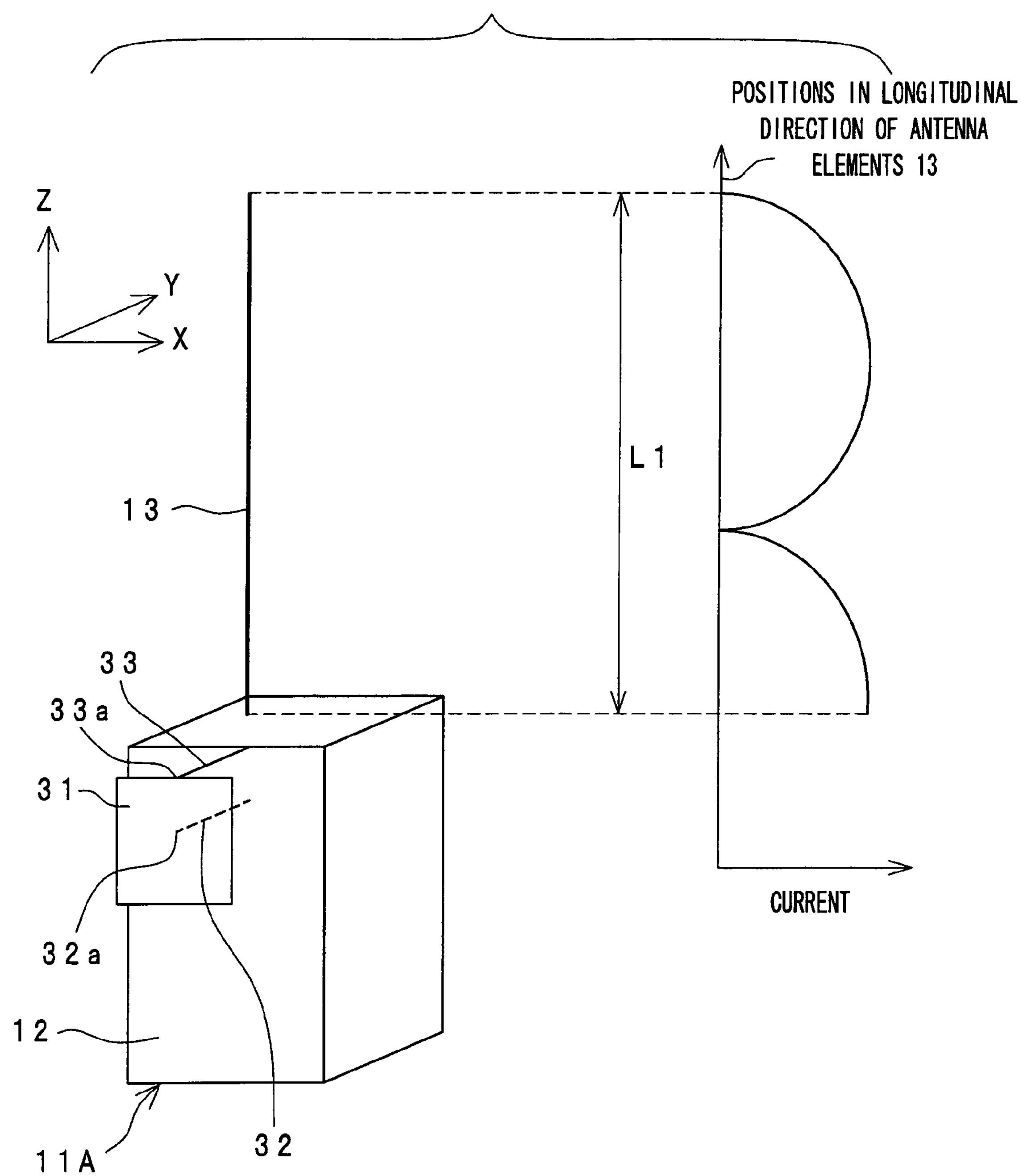
FIG. 8 is a perspective view showing a configuration of a radio communication apparatus 11A including an adaptive antenna apparatus according to a second preferred embodiment of the present invention and a current distribution with respect to a position in a longitudinal direction of the antenna element 13.

Referring to FIG. 4, when the total length is 1λ, the figure-8 characteristic is shown with only the nulls generated in the Z-axis direction. When the total length is 2λ, the nulls in +X and −X directions are generated in addition to the nulls in the Z-axis direction. When the total length is 3λ, two nulls are generated in the right half of the Z-X plane, and the other two nulls are generated in the left half of the plane in addition to the nulls in the Z-axis direction.

The description is made to FIG. 4 and the following drawings with reference to the radiation pattern on the vertical plane since, in FIG. 1, the antenna elements 13 and 14 of the adaptive antenna apparatus are provided with the longitudinal directions thereof which is vertical to the ground to transmit a radio signal with vertical polarization. In an actual usage, for example, when a telephone conversion is made or E-mail is sent, the radio communication apparatus 11 is used in an inclined state thereof. When the radio communication apparatus 11 is provided to be inclined at a predetermined angle relative to the horizontal direction, the directions of the nulls on the horizontal plane can be controlled by the adaptive antenna apparatus as far as the nulls are generated in the radiation pattern on the Z-X plane. Although the present preferred embodiment is described with reference to the example of providing the antennas in the longitudinal direction of the housing so that the nulls are generated on the vertical plane, the present invention is not limited thereto. It is needless to say that the similar advantageous effect can be obtained when the nulls are generated on the horizontal plane. In such a case, the nulls can be naturally generated on the horizontal plane when, for example, an antenna having an electrical length equal to or larger than λ/2 is provided in the shorter direction of the housing.

Although the present preferred embodiment is described with reference to the example of the radiation pattern of the dipole antenna in the free space, in the actual usage, cross-polarization components are generated due to reflections and the like under the influence of the surrounding environment. The cross-polarization components are particularly remarkably generated in the vicinity of the human body, and in this case, the similar advantageous effect can be obtained.

Figure 5:
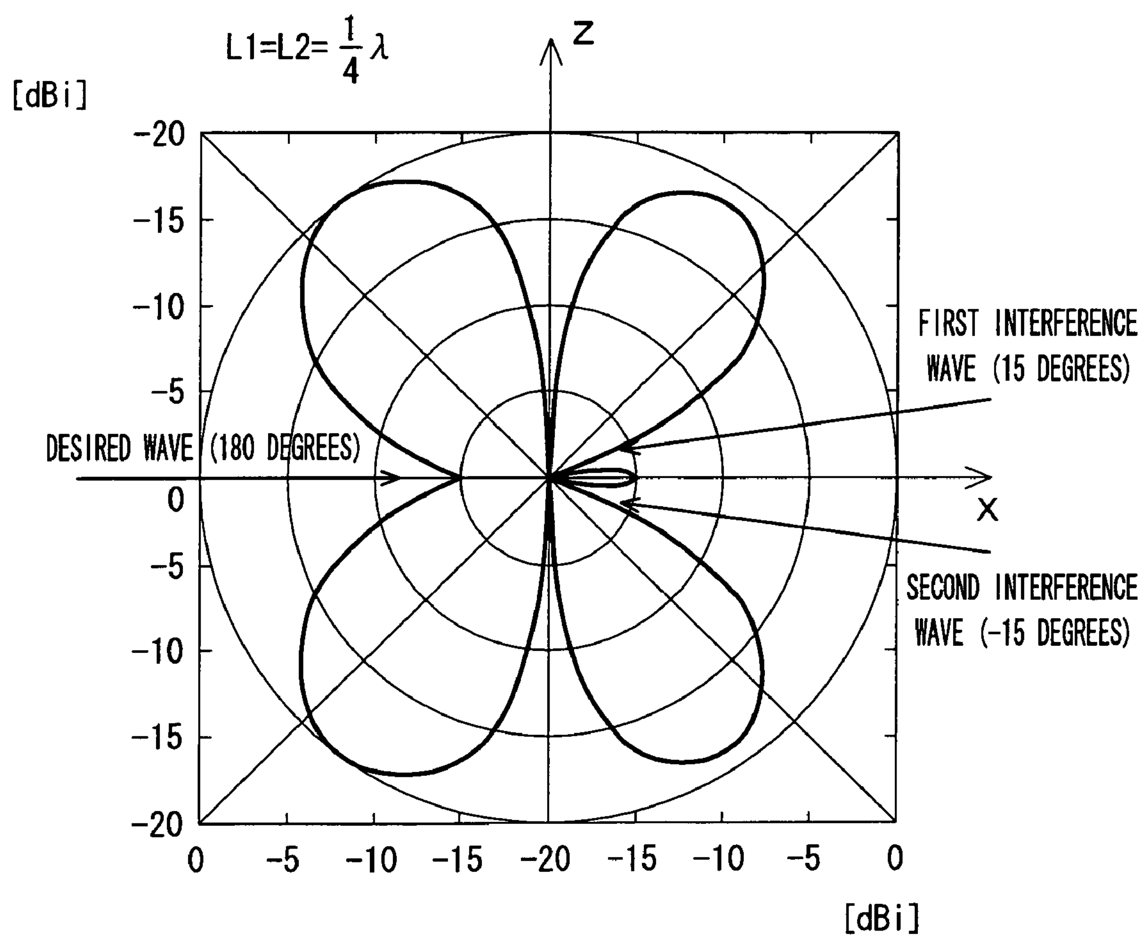
FIG. 5 shows simulation results of the adaptive antenna apparatus shown in FIG. 3, showing a radiation pattern on the Z-X plane after an adaptive control when a desired wave in the azimuth of 180 degrees, a first interference wave in the azimuth of 15 degrees, and a second interference wave in the azimuth of −15 degrees are incident thereto, where L1=L2=(¼)λ.

FIG. 5 shows simulation results of the adaptive antenna apparatus shown in FIG. 3, showing a radiation pattern on the Z-X plane after the adaptive control when a desired wave in the azimuth of 180 degrees, a first interference wave in the azimuth of 15 degrees, and a second interference wave in the azimuth of −15 degrees are incident thereto, where L1=L2=(¼)λ. Bit error rates and a desired wave power to interference wave power ratio (only after the adaptive control, hereinafter, referred to as a DU ratio) before and after the adaptive control in the case of FIG. 5 are shown as follows.

TABLE 1

| In case of FIG. 5 (Prior Art) |
|---|
| Before Adaptive Control: |
| BER in case of Only Dipole Antenna 13A = $2.29 \times 10^{-1}$ |
| BER in case of Only Dipole Antenna 14A = $2.29 \times 10^{-1}$ |
| After adaptive control: |
| BER in case of Using Dipole Antennas 13A and 14A = $6.12 \times 10^{-3}$ |
| DU Ratio = 8.0 dB |

Figure 6:
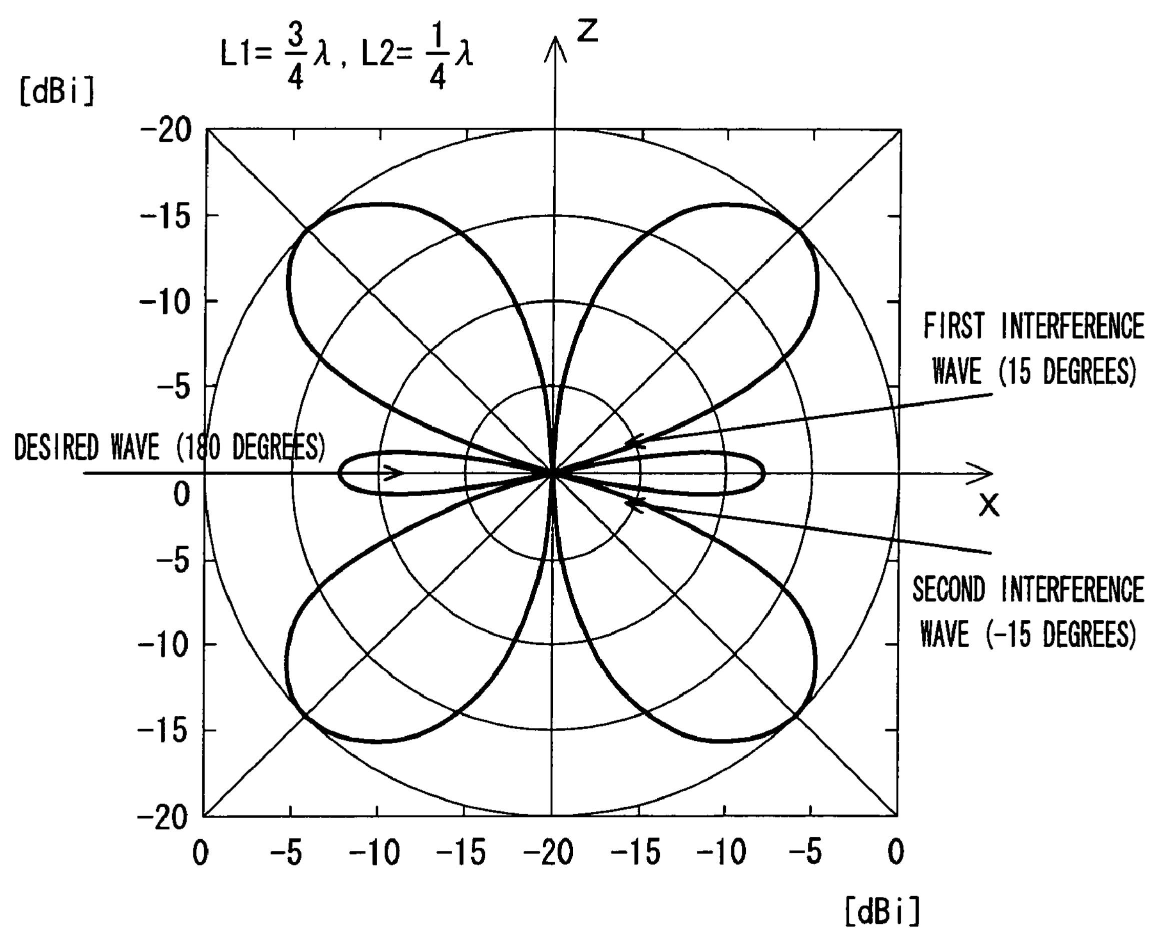
FIG. 6 shows simulation results of the adaptive antenna apparatus shown in FIG. 3, showing a radiation pattern on the Z-X plane after the adaptive control when the desired wave in the azimuth of 180 degrees, the first interference wave in the azimuth of 15 degrees, and the second interference wave in the azimuth of −15 degrees are incident thereto, where L1=(¾)λ and L2=(¼)λ.

FIG. 6 shows simulation results of the adaptive antenna apparatus shown in FIG. 3, showing a radiation pattern on the Z-X plane after the adaptive control when the desired wave in the azimuth of 180 degrees, the first interference wave in the azimuth of 15 degrees, and the second interference wave in the azimuth of −15 degrees are incident thereto, where of L1=(¾)λ and L2=(¼)λ. Bit error rates and a DU ratio (only after the adaptive control) before and after the adaptive control in the case of FIG. 6 are shown as follows.

TABLE 2

| In case of FIG. 6 (First Preferred Embodiment) |
|---|
| Before Adaptive Control: |
| BER in case of Only Dipole Antenna 13A = $2.38 \times 10^{-2}$ |
| BER in case of Only Dipole Antenna 14A = $2.29 \times 10^{-1}$ |
| After Adaptive Control: |
| BER in case of Using Dipole Antennas 13A and 14A <$1.0 \times 10^{-8}$ |
| DU Ratio = 25.4 dB |

Figure 7:
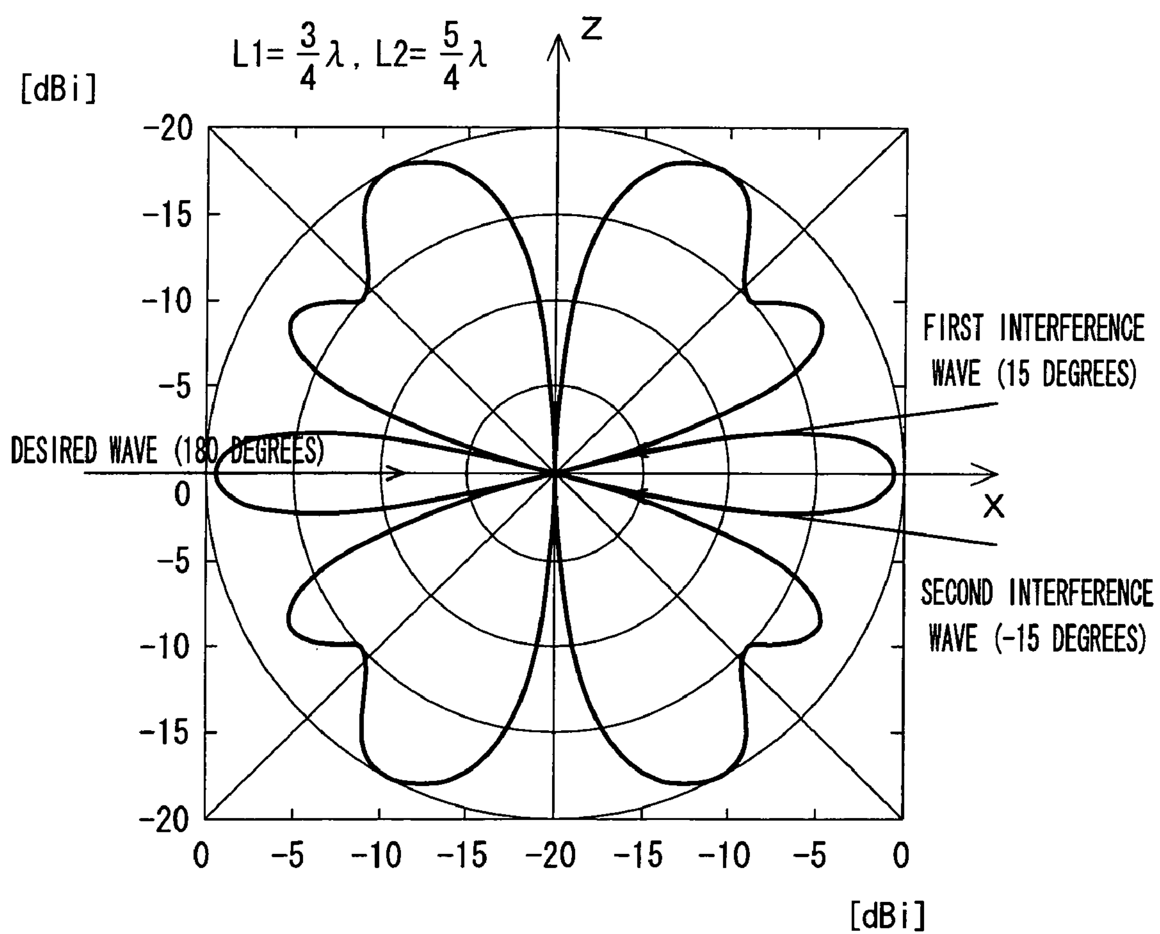
FIG. 7 shows simulation results of the adaptive antenna apparatus shown in FIG. 3, showing a radiation pattern on the Z-X plane after the adaptive control when the desired wave in the azimuth of 180 degrees, the first interference wave in the azimuth of 15 degrees, and the second interference wave in the azimuth of −15 degrees are incident thereto, where L1=(¾)λ and L2=(5/4)λ.

FIG. 7 shows simulation results of the adaptive antenna apparatus shown in FIG. 3, showing a radiation pattern on the Z-X plane after the adaptive control when the desired wave in the azimuth of 180 degrees, the first interference wave in the azimuth of 15 degrees, and the second interference wave in the azimuth of −15 degrees are incident thereto, where Li=(¾)λ and L2=(5/4)λ. Bit error rates and a DU ratio (only after the adaptive control) before and after the adaptive control in the case of FIG. 7 are shown as follows.

TABLE 3

| In case of FIG. 7 (Modified Preferred Embodiment of First preferred embodiment) |
|---|
| Before Adaptive Control: |
| BER in case of Only Dipole Antenna 13A = $2.38 \times 10^{-2}$ |
| BER in case of Only Dipole Antenna 14A = $6.29 \times 10^{-2}$ |
| After Adaptive Control: |
| BER in case of Using Dipole Antennas 13A and 14A <$1.0 \times 10^{-8}$ |
| DU Ratio = 32.9 dB |

The results shown in FIG. 5 and Table 1 relate to the adaptive antenna apparatus according to the prior art having the element length of L1=L2=(¼λ). The results shown in FIG. 6 and Table 2 relate to the adaptive antenna apparatus according to the first preferred embodiment having the element lengths of Li=(¾)λ and L2=(¼)λ. The results shown in FIG. 7 and Table 3 relate to the adaptive antenna apparatus according to the modified preferred embodiment of the first preferred embodiment having the element lengths of Li=(¾)λ and L2=(5/4)λ.

In the case of the results shown in FIG. 5 and Table 1 according to the prior art, the adaptive control operation is executed between the dipole antennas 13A and 14A having the total length of 1λ. Therefore, the bit error rate after the adaptive control is $6.12\times10^{-3}$ when an angle difference between the interference waves is such a relatively small angle as 30 degrees. In other words, the bit error rate is improved by approximately two digits in comparison to the bit error rate in the case of using only the dipole antenna 13A or 14A.

In the case of the results shown in FIG. 6 and Table 2 according to the first preferred embodiment, the plurality of nulls are present in the dipole antenna 13A, and the bit error rate before the adaptive control is $2.38\times10^{-2}$. As is apparent from this, the bit error rate is improved by approximately one digit in comparison to the results shown in FIG. 5 and Table 1. The adaptive control realizes an error free state by achieving the bit error rate of equal to or smaller than $10^{-8}$. Further, the DU ratio is 25.4 dB, and it is confirmed from this that the interference waves could be sufficiently suppressed.

In the case of the results shown in FIG. 7 and Table 3 according to the modified preferred embodiment of the first preferred embodiment, the element length L1 of the dipole antenna 13A is (¾)λ. On the other hand, the element length L2 of the dipole antenna 14A is (5/4)λ, and this case corresponds to that the total length of the dipole antenna 14A is 2.5λ. In the present case, there are even more nulls in the dipole antenna 14A than those in the dipole antenna 13A. However, the error free state can be realized with the bit error rate after the adaptive control which is equal to or smaller than $10^{-8}$, and the DU ratio is 32.9 dB. Then it is confirmed that the interference waves could be sufficiently suppressed.

Although, in the preferred embodiment described above, the linear monopole antennas 13 and 14 or the linear dipole antennas 13A and 14A are used, the present invention is not limited thereto. The element length of the antenna may be electrically reduced with a shortening capacitor so that the electrical length thereof is reduced, or the element length of the antenna may be electrically increased with an extending coil so that the electrical length thereof is increased. Therefore, the lengths of the respective antennas may be expressed by electrical lengths thereof taking into consideration that the lengths may be electrically reduced or increased.

Although, in the case of the first preferred embodiment shown in FIG. 1, the electrical length L1 of the antenna element 13 is set to (¾)λ, and the electrical length L2 of the antenna element 14 is set to (¼)λ, the present invention is not limited thereto, and the respective electrical lengths may be set as follows. The electrical length L1 of the antenna element 13 can be set to such a length as larger than λ/2 and allowing the antenna element 13 to be housed or mounted in the housing 12 (if the length is too long, it may be a value near the infinite value), an actual setting may be as follows. Further, although the electrical length L2 of the antenna element 14 can be set to such a length as larger than λ/2 and resonating at a desired frequency f, an actual setting may be as follows:

(I) about L1

$$\text{preferably, } \lambda/2 < L1 \leqq 10\lambda \quad (5),$$

$$\text{more preferably, } \lambda/2 < L1 \leqq 3\lambda \quad (6), \text{ and}$$

$$\text{even more preferably, } \lambda/2 < L1 \leqq \lambda \quad (7).$$

(II) about L2

$$\text{preferably, } \lambda/16 \leqq L2 \leqq \lambda/2 \quad (8),$$

$$\text{more preferably, } \lambda/8 \leqq L2 \leqq \lambda/2 \quad (9), \text{ and}$$

$$\text{even more preferably, } \lambda/4 \leqq L2 \leqq \lambda/2 \quad (10).$$

As described above, the adaptive control is executed in such a manner that the electrical lengths L1 and L2 of the two antenna elements 13 and 14 which are provided by are set in the above manner, the nulls equal to or larger than the degree of freedom of the antenna can be formed by utilizing the difference between the directivity gains on the vertical plane of the two antenna elements 13 and 14, although the degree of freedom is only one. This leads to an advantageous effect of suppression onto the interference waves. In other words, the digital data signal having a signal quality level higher than that of the prior art can be obtained even if the directions change in which the desired wave and the interference wave arrive.

Although in the radio communication circuit 110 shown in FIG. 2, the adaptive control is executed based on the digital signal, the present invention is not limited thereto, and an analog signal may be used instead. Further, although in the radio communication circuit 110 shown in FIG. 2, the amplitudes and the phases of the respective radio signals are adjusted so that the radiation pattern of the adaptive antenna apparatus is adaptively controlled, the present invention is not limited thereto. At least one of the amplitude and the phase of each radio signal may be adjusted in order to adaptively control the radiation pattern of the adaptive antenna apparatus. Although the radio communication circuit 110 shown in FIG. 2 includes only the radio receiver circuit, the present invention is not limited thereto. A radio transmitter circuit may be further provided in addition to the radio receiver circuit.

Second Preferred Embodiment

FIG. 8 is a perspective view showing a configuration of a radio communication apparatus 11A including an adaptive antenna apparatus according to a second preferred embodiment of the present invention and a current distribution with respect to a position in a longitudinal direction of the antenna element 13. The adaptive antenna apparatus according to the second preferred embodiment is different from the adaptive antenna apparatus according to the first preferred embodiment in that a plate-shaped inverted-F antenna 31 having an electrical length L2 is provided in place of the antenna element 14.

Referring to FIG. 8, the plate-shaped inverted-F antenna 31 is placed so that the plate-shape surface thereof is in parallel to the front surface of the housing 12 of the radio communication apparatus 11A. The plate-shape inverted-F antenna 31 operates so that the circumferential length thereof serves as a radiation antenna having the electrical length L2. A radio signal is fed into a feeding point 32*a* as located in the substantially central part of the plate-shape surface of the plate-shape inverted-F antenna 31 via a feeder cable and a feeder line 32 from the radio communication circuit 110. A short-circuit point 33*a* located in the substantially central part at the upper of the plate-shape inverted-F antenna 31 is short-circuited by a short-circuit line 33 extending from a ground conductor in the housing 12.

Although the plate-shape inverted-F antenna 31 is provided in the second preferred embodiment, the present invention is not limited thereto. Plate-shaped antennas of other type such as a patch antenna, a slot antenna, a loop antenna or the like, each having the electrical length of L2, may be used instead of the antenna 31.

In the second preferred embodiment, the difference between the directivity gains on the vertical plane of the two antenna elements 13 and 31 is utilized so that the nulls equal to or larger than the degree of freedom can be formed, and the interference waves can be effectively suppressed in a manner similar to that of the first preferred embodiment. In other words, the digital data signal having the signal quality level higher than that of the prior art can be obtained even if the directions change in which the desired wave and the interference wave arrive.

Third Preferred Embodiment

Figure 9:
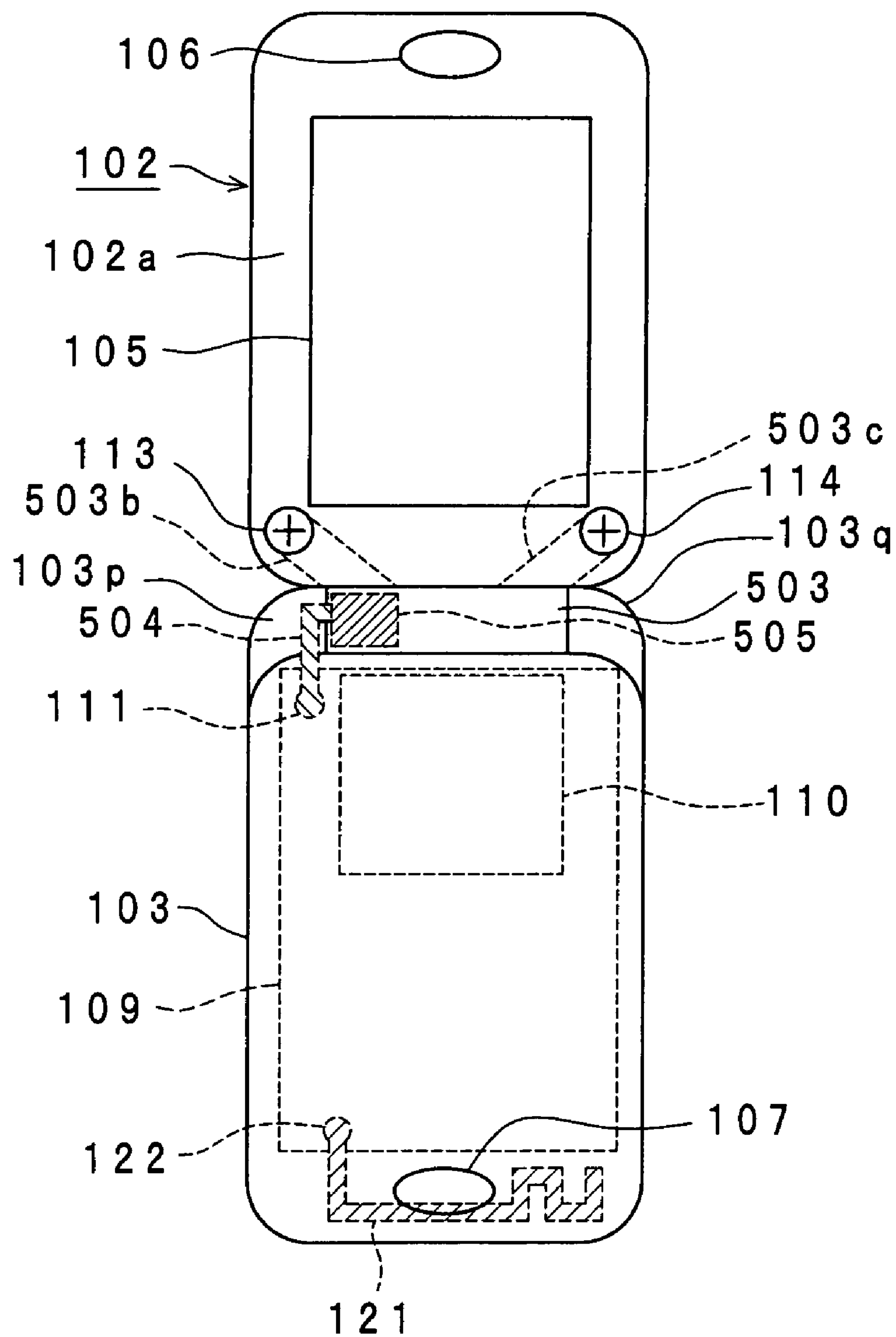
FIG. 9 is a plan view showing an open state of a folding type mobile radio communication apparatus including an adaptive antenna apparatus according to a third preferred embodiment of the present invention.
Figure 10:
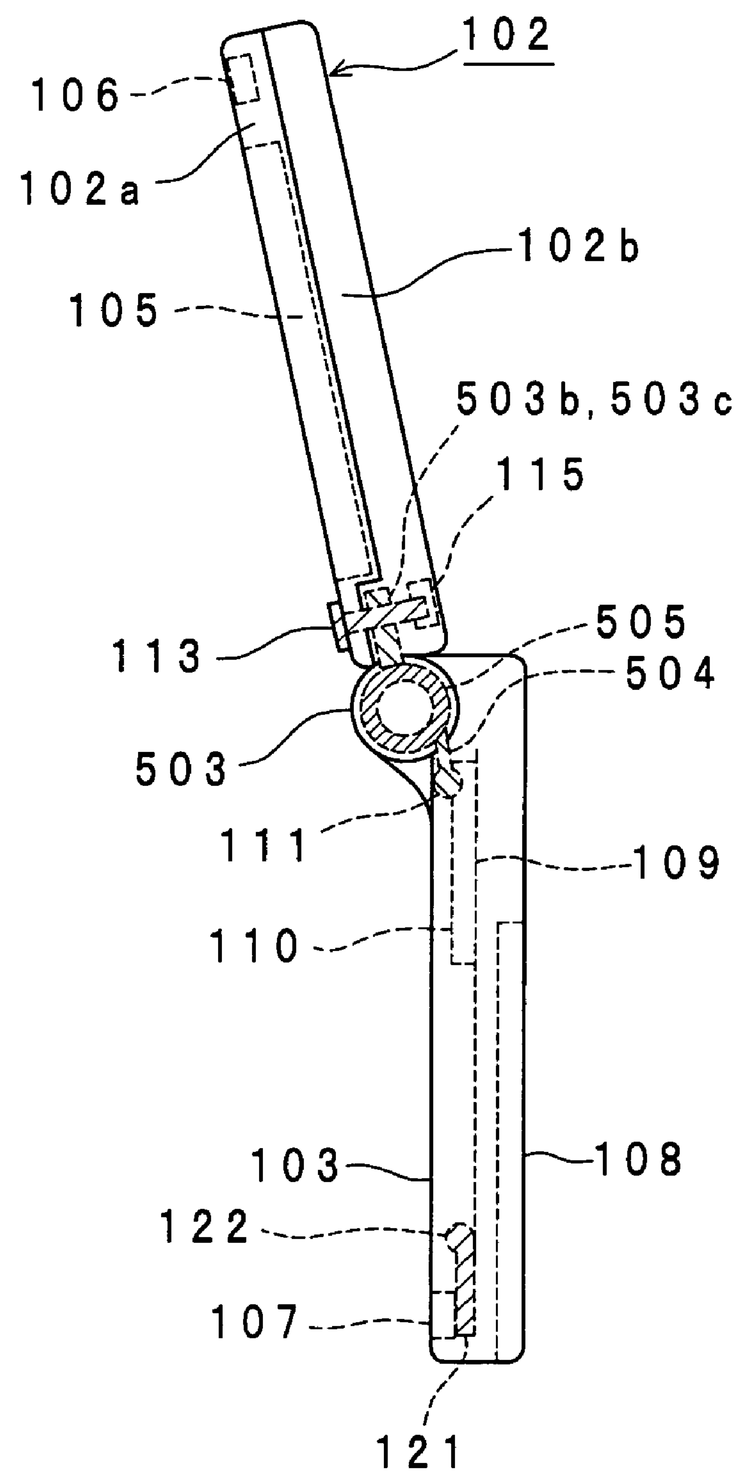
FIG. 10 is a view of the folding type mobile radio communication apparatus shown in FIG. 9.

FIG. 9 is a plan view showing an open state of a folding type mobile radio communication apparatus including an adaptive antenna apparatus according to a third preferred embodiment of the present invention. FIG. 10 is a view of the folding type mobile radio communication apparatus shown in FIG. 9.

In FIGS. 9 and 10, the mobile radio communication apparatus according to the present preferred embodiment includes an upper housing 102 and a lower housing 103, where the upper housing 102 and the lower housing 103 are connected to each other in a foldable manner via a hinge part 503 having a shape of circular cylinder. The upper housing 102 includes an upper first housing part 102*a* provided on the inner side thereof, and an upper second housing part 102*b* provided on the outer side thereof, where these two housing parts 102*a* and 102*b* are bonded to be coupled with each other. In the description below, the surface of the upper first housing part 102*a* facing the inner side of the apparatus is referred to as "an inner surface", and the surface of the upper second housing part 102*b* facing the outer side of the apparatus is referred to as "an outer surface". The hinge part 503 is, for example, formed to be integral with the upper first housing part 102*a*. The hinge part 503 is fitted into the central part on the top end part of the lower housing 103 (located between a top left edge portion 103*p* and a top right edge portion 103*q*). A cylindrical axis (not shown) penetrating through a cylindrical hollow of the hinge part 503 and extending into the top left edge portion 103*p* and the top right edge portion 103*q* of the lower housing 103 allows the upper housing 102 and the lower housing 103 to be rotatable and foldable relative to each other on the hinge part 503. The two housing parts 102*a* and 102*b* are secured with screws 113 and 114 at right and left corner parts on bottom ends thereof, so that the screws 113 and 114 penetrate through the upper housing part 102*a* from the inner surface to the outer surface thereof to finally reach the screw receiving parts 115 of the upper second housing part 102*b*.

At least one part of the upper first housing part 102*a* is made of an electrically conductive material such as magnesium or zinc. On the other hand, the upper second housing part 102*b* is made of an electrical insulating material such as resin. As described in detail later, all part of the upper first housing part 102*a* may be formed of an electrically conductive material. Otherwise, a housing part of the upper first housing part 102*a* may be formed of an electrically insulating material such as a resin material, and on the surface thereof is formed an electrically conductive layer made of the electrically conductive material. The part on which the conductive material is formed in the upper first housing part 102*a* is hereinafter referred to as "an electrically conductive part".

A liquid crystal display 105 is provided in the substantially central part on the inner surface of the upper first housing part 102*a*, and a sound hole part 106 is formed at an upper part of the liquid crystal display 105 and on the top end of the inner surface thereof. A loudspeaker (not shown) for generating a voice of the party to be communicated with is provided immediately below the sound hole part 106 so that the voice generated from the loudspeaker can be aurally heard to a user of the mobile radio communication apparatus via the sound hole part 106. A microphone 107 is provided on the surface facing the inner of the lower housing 103 (hereinafter, referred to as inner surface) and near the bottom end part opposite to the hinge part 503. A battery 108 is provided on the surface of the lower housing 103 opposite to the surface on which the microphone 107 is provided (hereinafter, referred to as an outer surface). A printed-circuit board 109 is provided in the substantially central part of the lower housing 103 in the thickness direction thereof inside of the lower housing 103, and a radio communication circuit 110 further including a radio transmitter is formed on the printed-circuit board 109. A ground pattern of the printed-circuit board 109 operates as a ground for the antenna.

Figure 11:
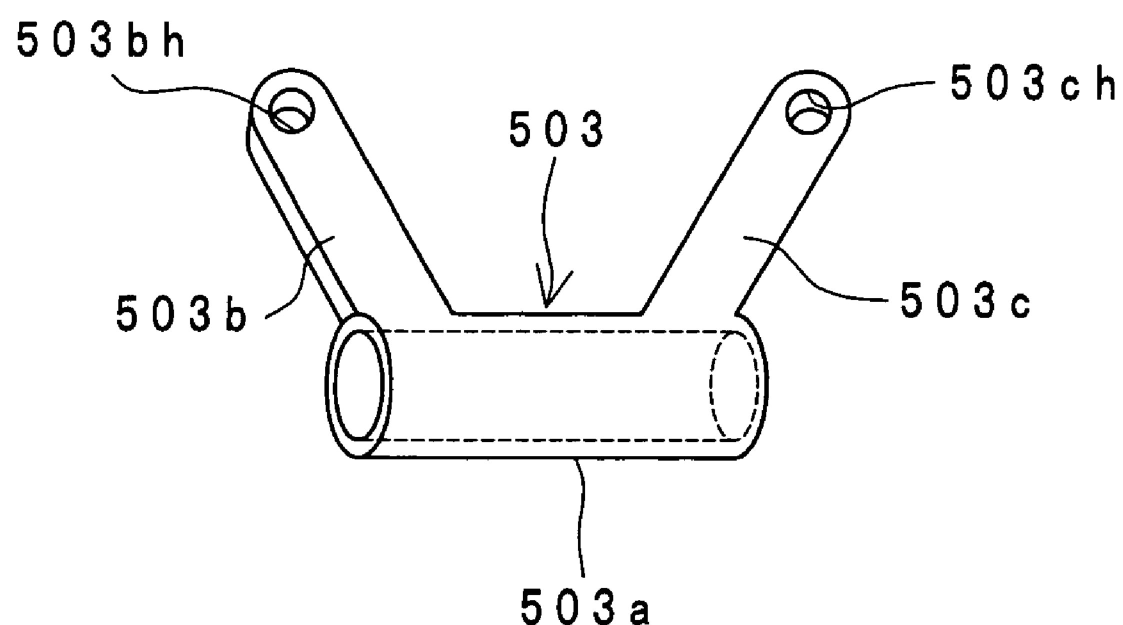
FIG. 11 is a perspective view of a hinge part 503 for use in the folding type mobile radio communication apparatus shown in FIGS. 9 and 10.
Figure 12:
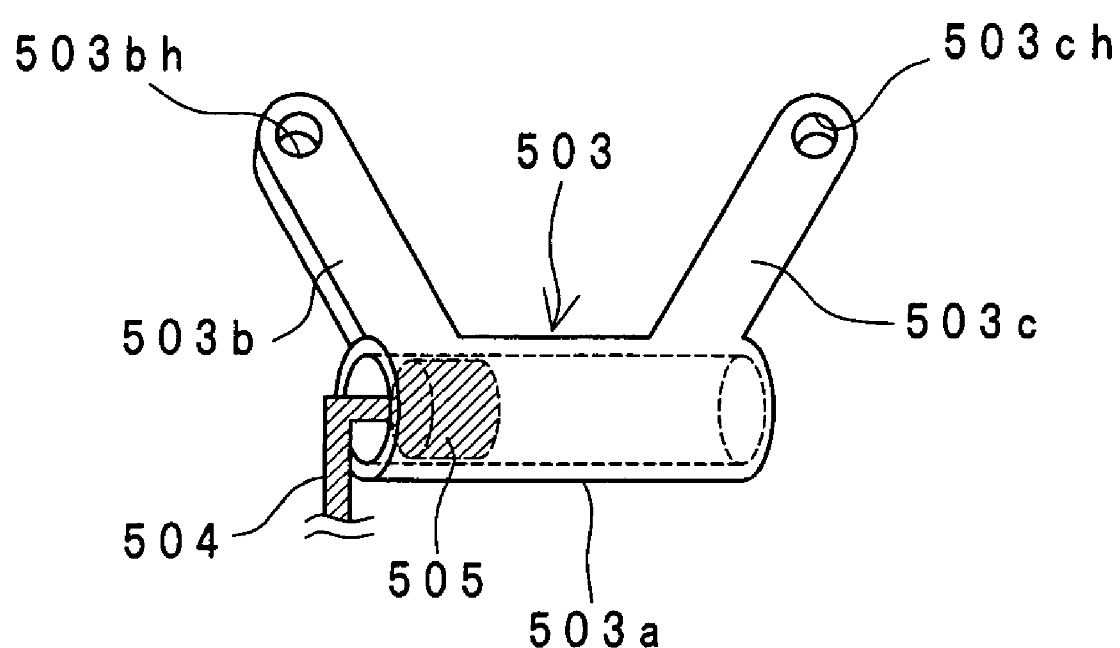
FIG. 12 is a perspective view of a fitting cylindrical member 505 connected to the hinge part 503 shown in FIG. 11 and an antenna element 504 connected to the fitting cylindrical member 505.

FIG. 11 is a perspective view of the hinge part 503 for use in the folding type mobile radio communication apparatus shown in FIGS. 9 and 10. FIG. 12 is a perspective view of a fitting cylindrical member 505 connected to the hinge part 503 shown in FIG. 11, and an antenna element 504 connected to the fitting cylindrical member 505. The hinge part 503 is formed of an electrically conductive material such as aluminum or zinc, and, as shown in FIGS. 11 and 12, includes the fitting cylindrical member 505. The fitting cylindrical member 505 is connected to the antenna element 504 connected to a connection point 111 which is a feeding point for the radio communication circuit 110, is fitted into the hinge part 503, and is formed of the electrically conductive material such as aluminum or zinc. A part of the hinge part 503 should be formed of the electrically conductive material. In the hinge part 503, a metal film may be formed in a predetermined pattern on the surface of the resin material, or the resin material may be formed on the surface or a part of the conductive material.

Referring to FIG. 11, the hinge part 503 includes a cylindrical portion 503*a*, and two leg portions 503*b* and 503*c* extending obliquely upward from right and left edge portions of the cylindrical portion 503*a*. The leg portions 503*b* and 503*c* include circular holes 503*bh* and 503*ch* penetrating through in the thickness direction near end parts thereof. The leg portions 503*b* and 503*c* are respectively inserted and fitted into the upper second housing part 102*b*, and the screws 113 and 114 are respectively inserted into the circular holes 503*bh* and 503*ch*, so that the leg portions 503*b* and 503*c* are secured to the upper second housing part 102*b* with the screws 113 and 114. Referring to FIG. 12, the end of the antenna element 504 is coupled with a part of the cylindrical end surface of the fitting cylindrical member 505. The fitting cylindrical member 505 is formed in such a manner that the outer diameter thereof substantively corresponds to the inner diameter of the cylindrical portion 503*a* of the hinge part 503, so that the fitting cylindrical member 505 is inserted and fitted into the cylinder of the cylindrical portion 503*a*.

In the mobile radio communication apparatus, the connection point 111, which is the feeding point for the radio communication circuit 110, is electrically connected to the upper first housing part 102*a* via the antenna element 504, the fitting cylindrical member 505, and the hinge part 503. Accordingly, the antenna element 504, the fitting cylindrical member 505, the hinge part 503, and the upper first housing part 102*a* (peripheral length thereof can be an electrical length of a rectangular conductive antenna) can operate as a first antenna element. The electrical length of the first antenna element is set to, for example, the value of the electrical length L1 of the antenna element 13 shown in FIG. 1. At the connection point between the hinge part 503 and the fitting cylindrical member 505 or at the connection point 111, an input impedance with respect to the antenna should be sufficiently low to be a predetermined impedance such as 50Ω, in a predetermined frequency band such as 900 MHz.

Because the antenna element 504, the hinge part 503 and the upper first housing part 102*a* operate as the first antenna element in the mobile radio communication apparatus thus constituted, the dimension of the antenna apparatus can be increased, and the antenna gain can be remarkably increased in comparison to such a configuration that only the upper first housing 102*a* operates as the antenna element.

In the mobile radio communication apparatus, a connection point 122, which is another feeding point for the radio communication circuit 110, is provided with a built-in antenna element 121 located inside of the lower housing 103 at the bottom end central part thereof (preferably having a zigzag shape at the edge thereof as shown in FIG. 9 in order to increase the electrical length thereof). The built-in antenna element 121 is used as a second antenna element, and the electrical thereof is set to, for example, the value of the electrical length L2 of the antenna element 14 shown in FIG. 1.

In the mobile radio communication apparatus thus constituted, the impedance should be sufficiently low to be the predetermined impedance such as 50Ω in a predetermined frequency band such as 2 GHz at the connection point 111 as the feeding point. A capacitance ring (not shown) formed of a material such as a dielectric material may be inserted between the hinge part 503 and the fitting cylindrical member 505 so that a radio signal is fed into the antenna through the capacitance (as called a capacitive power supply).

In the mobile radio communication apparatus thus constituted, the upper first housing part 102*a*, the hinge part 503 and the fitting cylindrical member 505 serve as a part or the entirety of the first antenna element having the electrical length L1 larger than λ/2. The built-in antenna element 121 provided in the lower housing part 103 operates as the second antenna element having the electrical length L2 below λ/2. Therefore, in the third preferred embodiment, the difference between the directivity gains on the vertical plane of the two antenna elements is utilized so that the nulls equal to or larger than the degree of freedom can be formed, and the interference waves can be effectively suppressed in a manner similar to that of the first preferred embodiment. In other words, the digital data signal having the signal quality level higher than that of the prior art can be obtained even if the directions change in which the desired wave and the interference wave arrive. More concretely, a half-wavelength at the frequency of 2 GHz is 7.5 cm, the length of the upper housing 102 is approximately 10 cm, and the electrical length of the built-in antenna element 121 is approximately λ/4. As a result, the antenna apparatus can operates in a manner similar to that of the first preferred embodiment.

Fourth Preferred Embodiment

Figure 13:
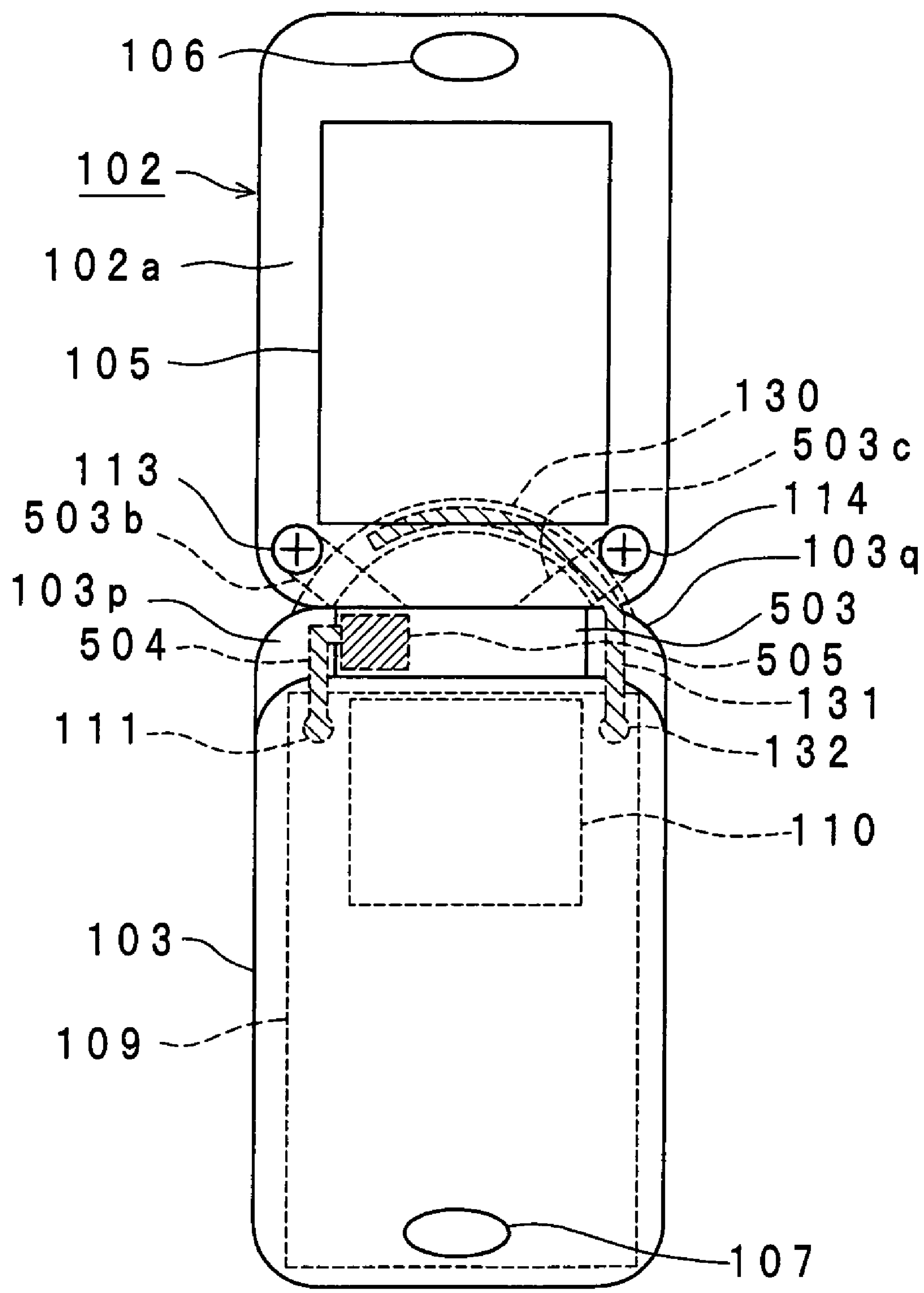
FIG. 13 is a plan view showing an open state of a folding type mobile radio communication apparatus including an adaptive antenna apparatus according to a fourth preferred embodiment of the present invention.
Figure 14:
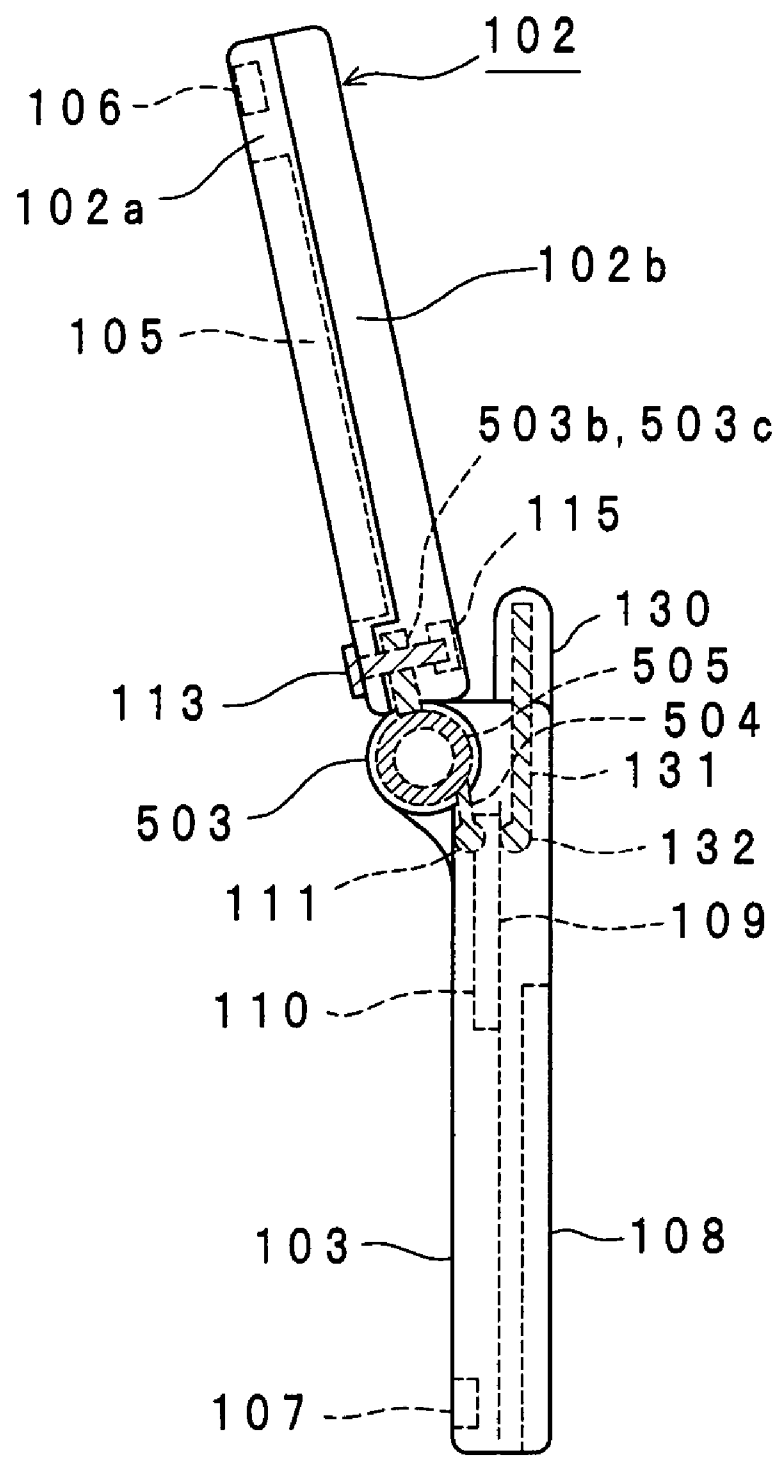
FIG. 14 is a view of the folding type mobile radio communication apparatus shown in FIG. 13.

FIG. 13 is a plan view showing an open state of a folding type mobile radio communication apparatus including an adaptive antenna apparatus according to a fourth preferred embodiment of the present invention. FIG. 14 is a view of the folding type mobile radio communication apparatus shown in FIG. 13. The mobile radio communication apparatus according to the fourth preferred embodiment is different from the mobile radio communication apparatus according to the third preferred embodiment in that a linear antenna element 131 is incorporated in a boom unit 130 formed in vicinity of the hinge part 503 in place of the built-in antenna element 121.

Referring to FIGS. 13 and 14, the boom unit 130 is formed of a resin material (preferably, which is a resin material having flexibility) having a curved substantially circular cylindrical shape, and is provided to be coupled with the right and left ends on the upper-end surface of the lower housing 103. In other words, both ends of the boom unit 130 are connected to be substantially bilaterally-symmetric in the width direction of the mobile radio communication apparatus. In this case, a through hole (or void) is formed in a space surrounded by the boom unit 130 and the lower housing 103. In the boom unit 130, there is incorporated the antenna element 131 having, for example, a ¼ wavelength, which operates as a second antenna element of the mobile radio communication apparatus. The antenna element 131 is connected to a connection point 132 which is a feeding point for the radio communication circuit 110, through the inside of the boom unit 130 and the inside of the lower housing 103. The electrical length of the antenna element 131 is set to the electrical length L2 of the antenna element 14 shown in FIG. 1.

The two antenna elements according to the fourth preferred embodiment thus constituted operate in a manner similar to those of the first and third preferred embodiments. The through hole (or air gap) may be of course covered with a material such as a resin. It is needless to say that the antenna element 131 may be constituted as a built-in antenna.

Fifth Preferred Embodiment

Figure 15:
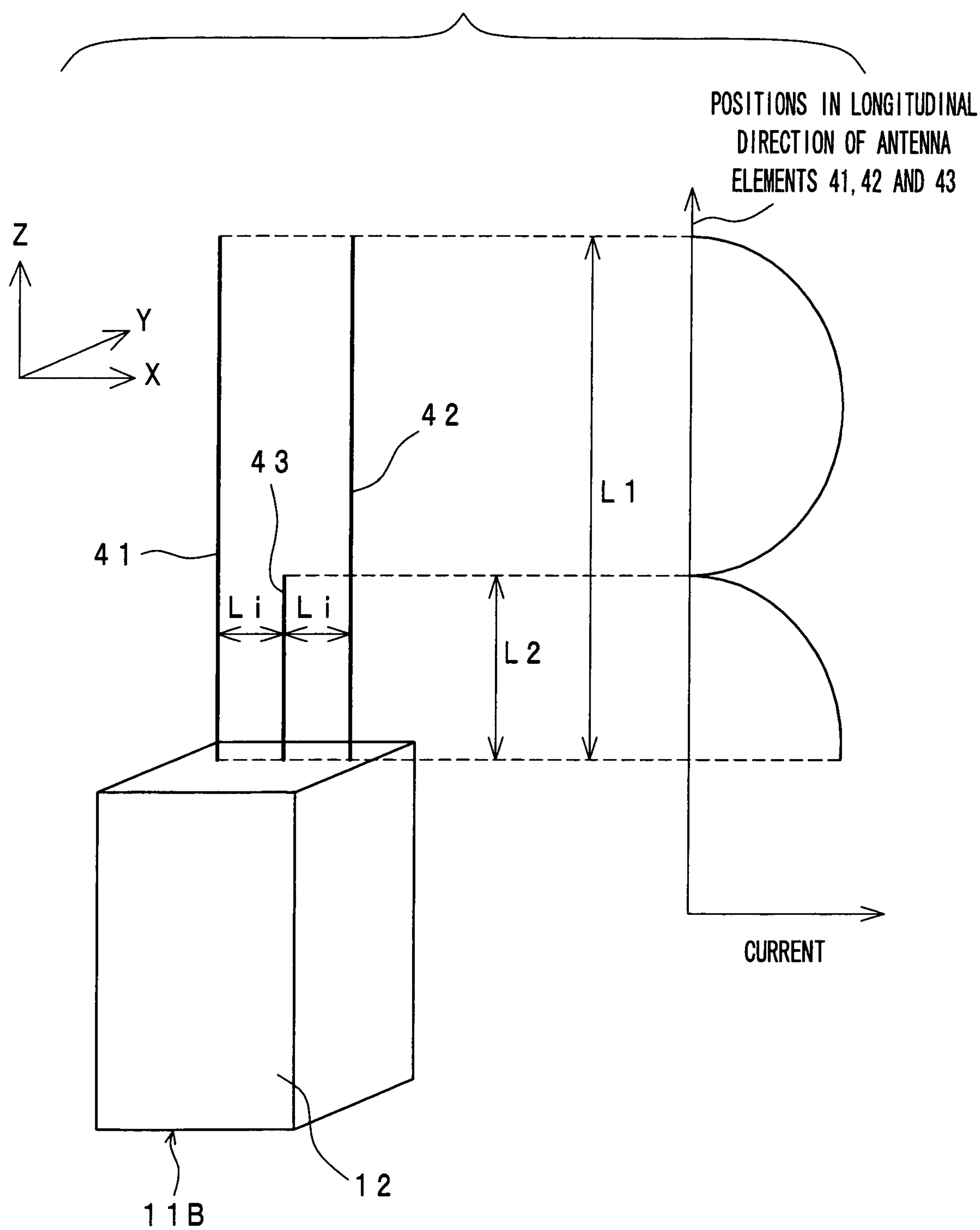
FIG. 15 is a perspective view showing a configuration of a radio communication apparatus 11B including an adaptive antenna apparatus according to a first aspect of a fifth preferred embodiment of the present invention and a current distribution with respect to positions in a longitudinal direction of antenna elements 41, 42 and 43.
Figure 16:
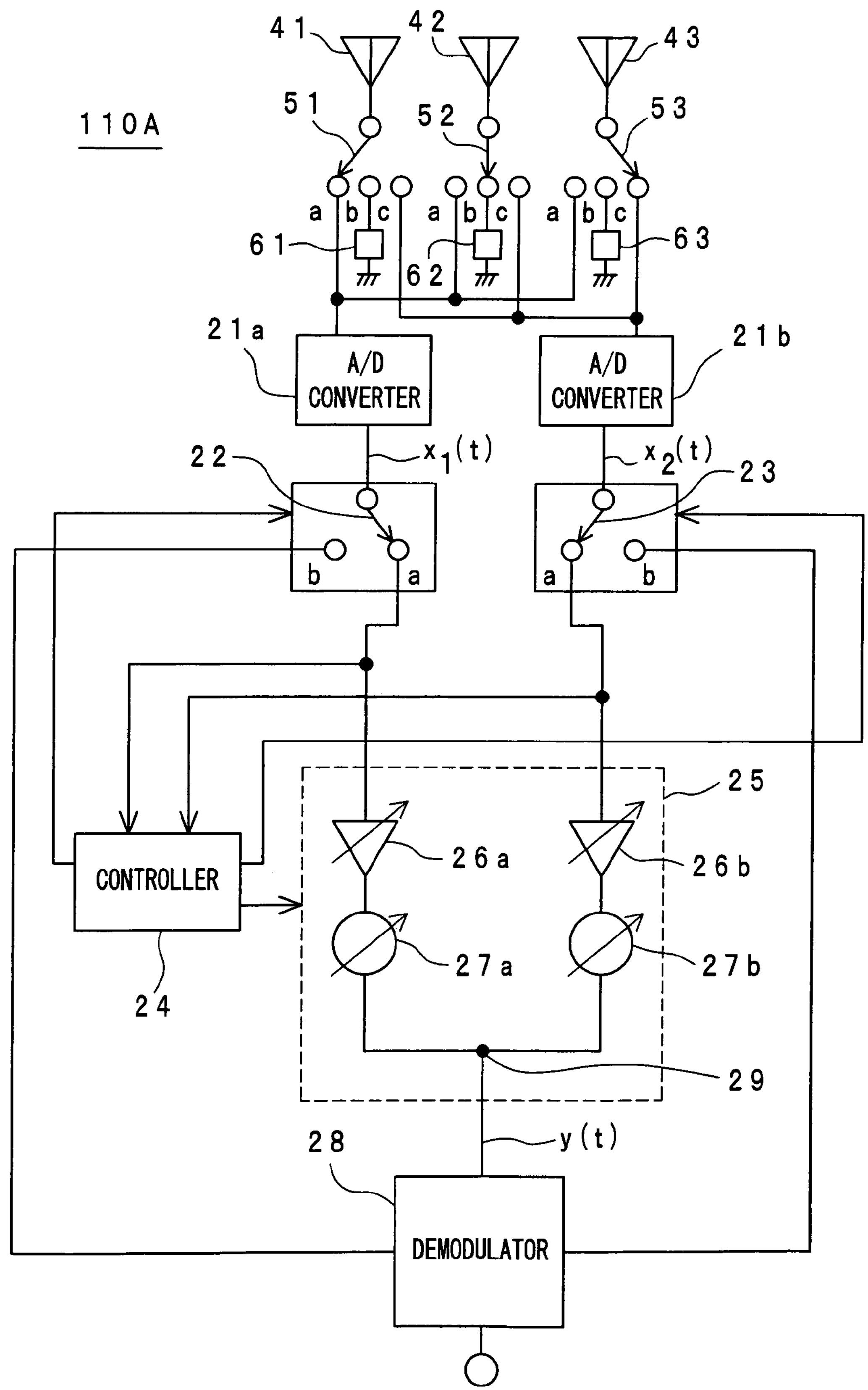
FIG. 16 is a block diagram showing a circuit configuration of a radio communication circuit 110A of the radio communication apparatus 11B shown in FIG. 15.
Figure 17:
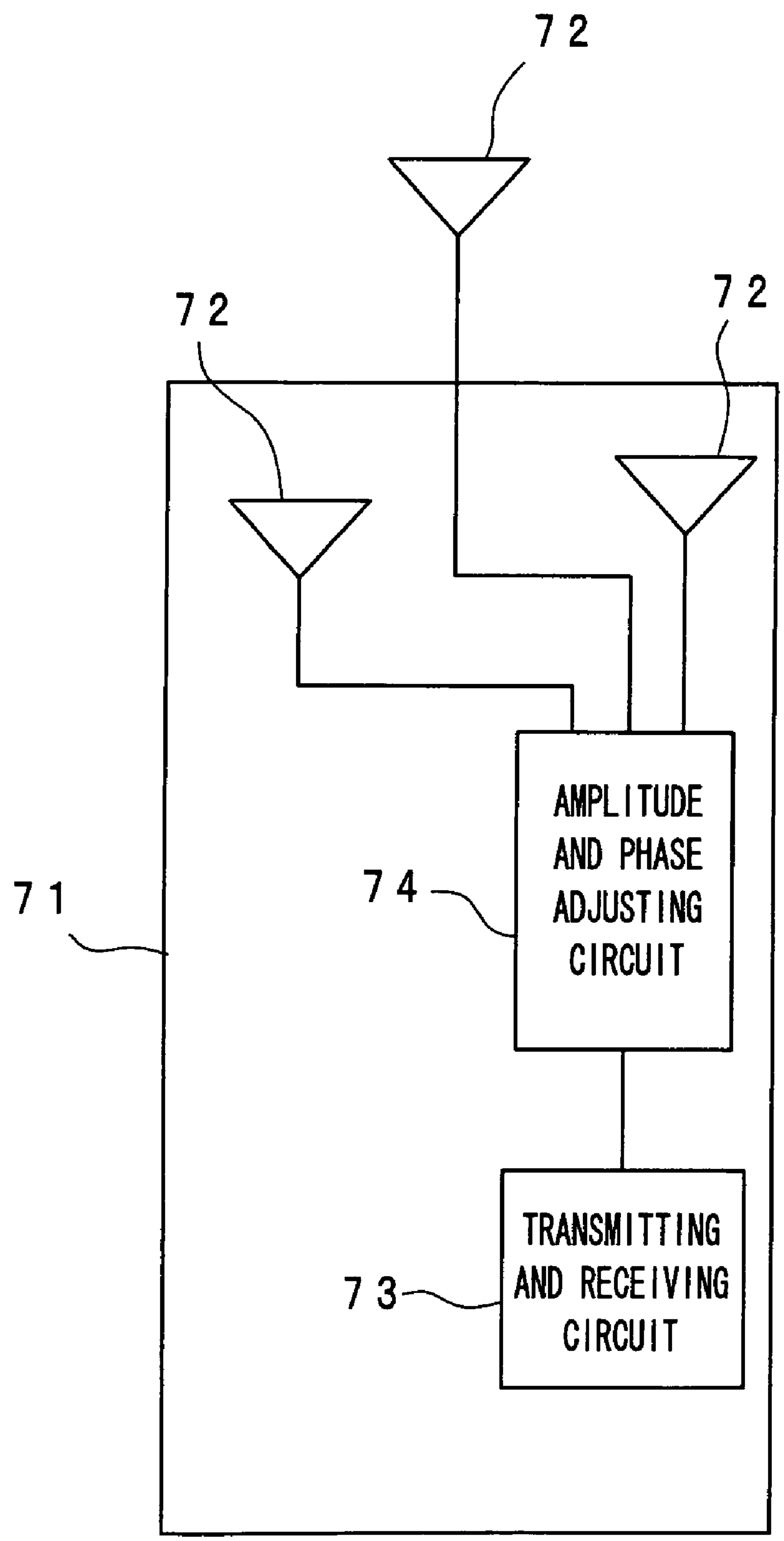
FIG. 17 is a block diagram showing a configuration of an antenna apparatus for a mobile terminal according to a first prior art.
Figure 18:
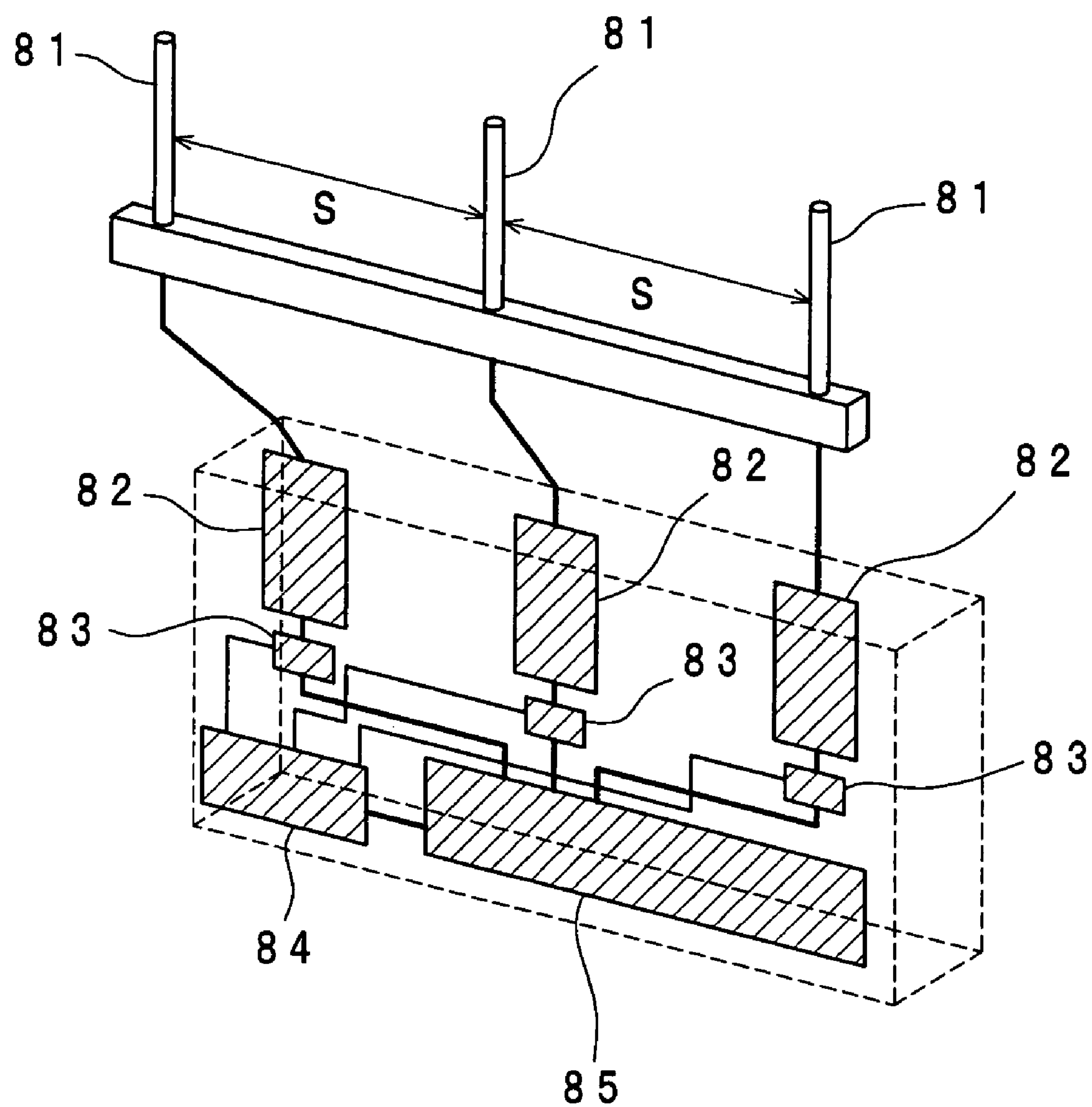
FIG. 18 is a block diagram showing a configuration of a base station antenna apparatus for a mobile communication according to a second prior art.

FIG. 15 is a perspective view showing a configuration of a radio communication apparatus 11B including an adaptive antenna apparatus according to a fifth preferred embodiment of the present invention and a current distribution with respect to positions in a longitudinal direction of antenna elements 41, 42 and 43. FIG. 16 is a block diagram showing a circuit configuration of a radio communication circuit 110A of the radio communication apparatus 11B shown in FIG. 15. The adaptive antenna apparatus according to the fifth preferred embodiment is different from the adaptive antenna apparatus according to the first preferred embodiment in that the three antenna elements 41, 42 and 43 are provided in place of the two antenna elements 13 and 14, and the antenna elements 41 and 42 respectively have the electrical length L1. On the other hand, the antenna element 43 has the electrical length L2. The set values of the electrical lengths L1 and L2 are respectively set in a manner similar to that of the first preferred embodiment.

The radio communication circuit 110A shown in FIG. 16 is different from the radio communication circuit 110 shown in FIG. 2 in that there are provided at the previous stage of A/D converters 21*a* and 21*b*, (a) the three antenna elements 41, 42 and 43, (b) the three switches 51, 52 and 53 respectively connected to the antenna elements 41, 42 and 43, and (c) parasitic elements 61, 62 and 63 respectively having one ends connected to the contacts "b" of the switches 51, 52 and 53, and having another ends grounded. The contacts "a" of the switches 51, 52 and 53 are connected to an input terminal of the A/D converter 21*a*, and the contacts "c" of the switches 51, 52 and 53 are connected to an input terminal of the A/D converter 21*b*. The switches 51, 52 and 53 are controlled in such a manner that any two of the three antenna elements 41, 42 and 43 are connected to the A/D converters 21*a* and 21*b*, and the remaining antenna element is connected to the passive element (any one of 61, 62 and 63). A controller 24 operates in a manner similar to that of the first preferred embodiment.

In the radio communication apparatus 11B according to the fifth preferred embodiment thus constituted, the difference among the directivity gains on the vertical plane of at least two of the three antenna elements 41, 42 and 43 is utilized so that the nulls equal to or larger than the degree of freedom can be formed, and the interference waves can be effectively suppressed in a manner similar to that of the first preferred embodiment. In other words, the digital data signal having the signal quality level higher than that of the prior art can be obtained even if the directions change in which the desired wave and the interference wave arrive.

Further, when, for example, a user's finger touches a particular antenna element, the rest of the antenna elements can be used for the adaptive control operation so that the signal quality level can be prevented from deteriorating. This is particularly advantageous when a part of a human body such as the user's finger or head, or any obstacle such as a bag approaches the antenna elements. More particularly, radiation characteristics of the respective antenna elements change as the time elapses in the actual usage, and therefore, it is supposed that the effect of improving C/(N+1) obtained by the adaptive control may change. In this case, when a number of options are prepared so that the highest signal quality level can be selected, the signal quality can be prevented from deteriorating. Further, the signal quality levels in a part or all of the antenna elements in the case of the single antenna by the non-adaptive control and the signal quality level by the adaptive control are compared with one other so that the signal quality level larger than the others is selected. The signal quality level can be thus prevented from deteriorating.

In the fifth preferred embodiment, the electrical length of the antenna element 41 is set to L1, the electrical length of the antenna element 42 is set to L1, and the electrical length of the antenna element 43 is set to L2 (in this case, the set values of the electrical lengths L1 and L2 are set within the set range as described in the first preferred embodiment). However, the present invention is not limited thereto, and the electrical lengths may be set as follows so that the nulls equal to or larger than the degree of freedom can be formed by utilizing the difference between the directivity gains on the vertical plane of at least two of the three antenna elements, and the interference waves can be effectively suppressed.

Figure 19:
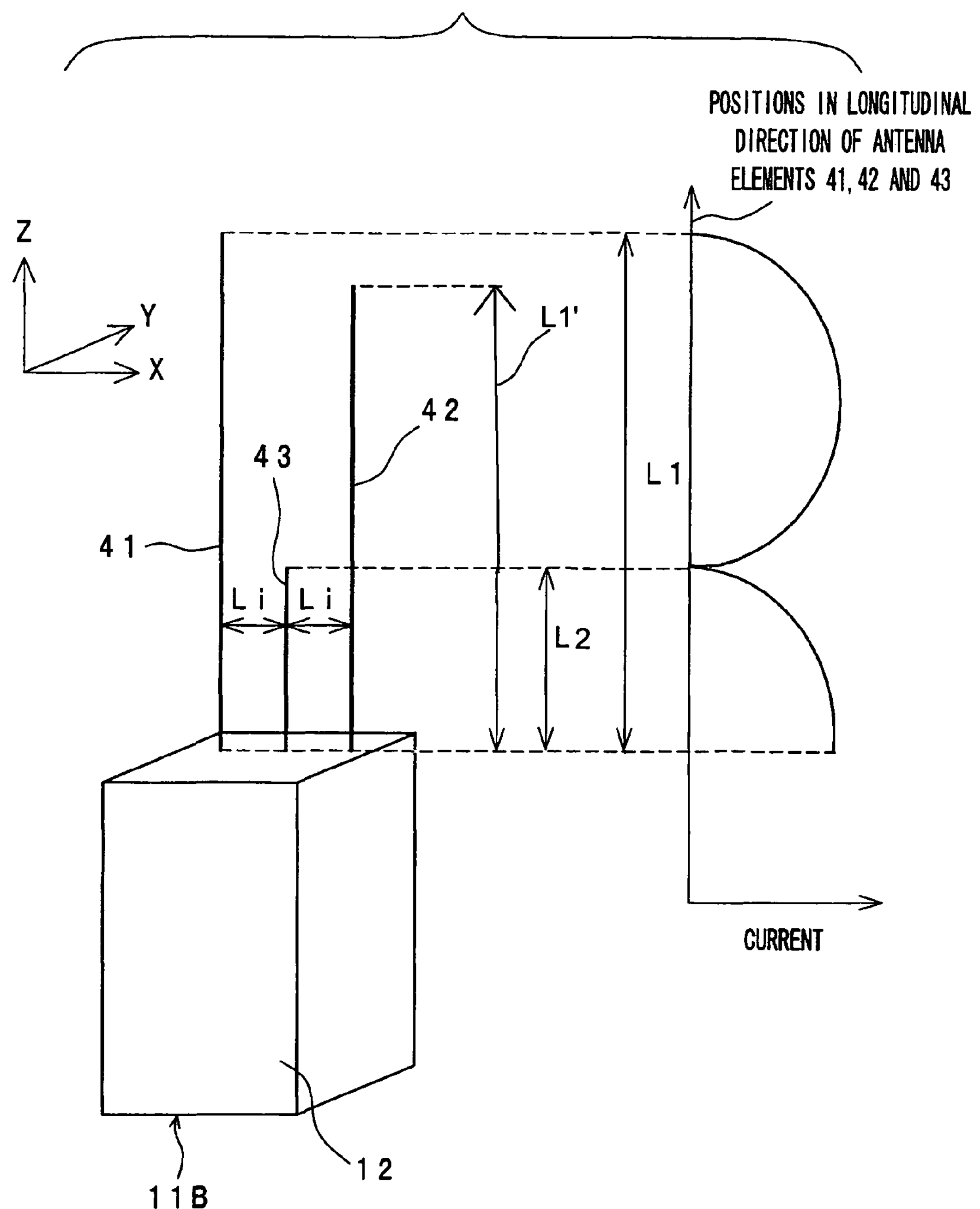
FIG. 19 is a perspective view showing a configuration of a radio communication apparatus 11B including an adaptive antenna apparatus according to a second aspect of a fifth preferred embodiment of the present invention and a current distribution with respect to positions in a longitudinal direction of antenna elements 41, 42 and 43.

(I) The electrical length of the antenna element 41 is set to L1, the electrical length of the antenna element 42 is set to L1'(≠L1), and the electrical length of the antenna element 43 is set to L2. The electrical length L1' is set within the set range of the electrical length L1 in the first preferred embodiment (see FIG. 19).

Figure 20:
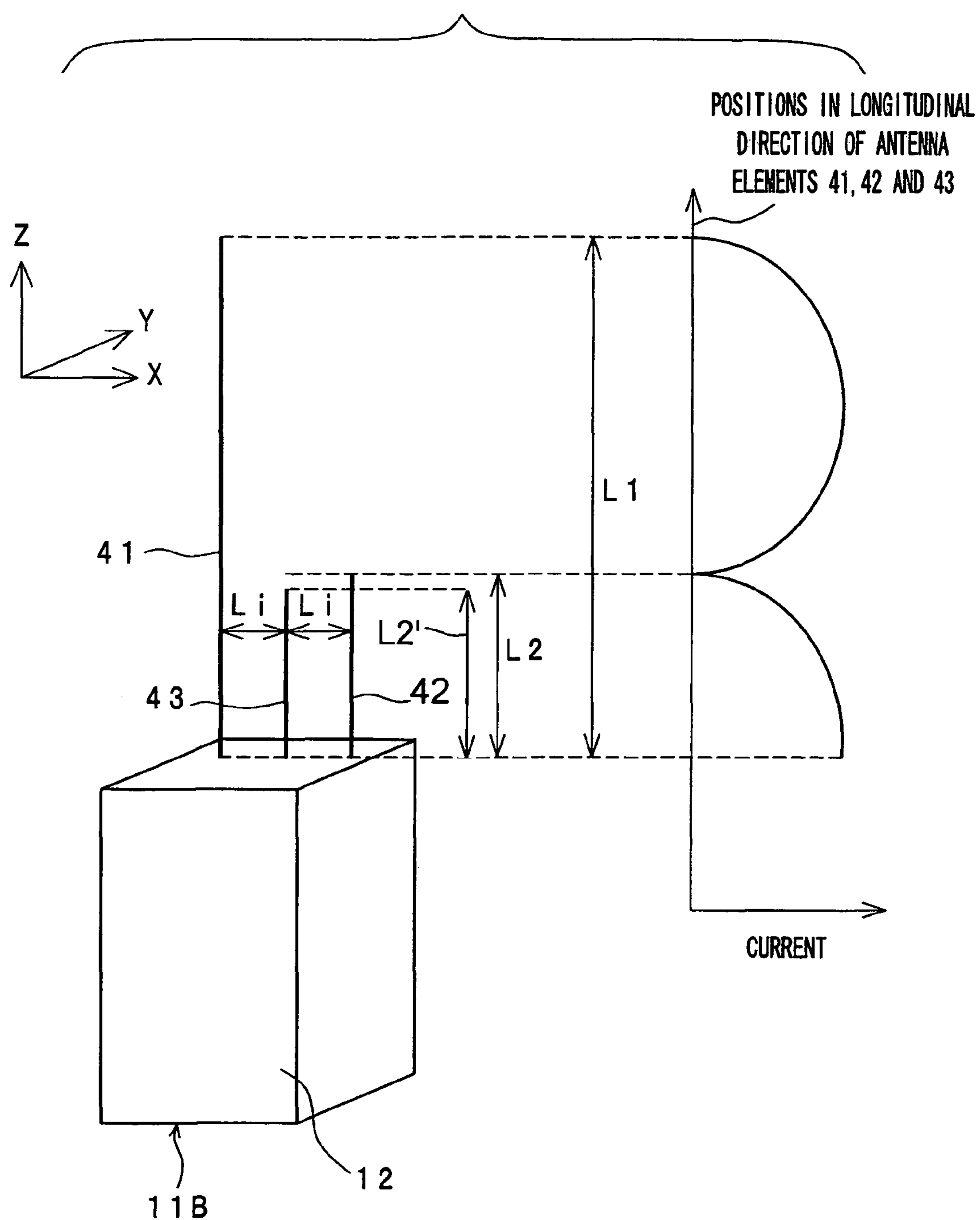
FIG. 20 is a perspective view showing a configuration of a radio communication apparatus 11B including an adaptive antenna apparatus according to a third aspect of a fifth preferred embodiment of the present invention and a current distribution with respect to positions in a longitudinal direction of antenna elements 41, 42 and 43.

(II) The electrical length of the antenna element 41 is set to L1, the electrical length of the antenna element 42 is set to L2, and the electrical length of the antenna element 43 is set to L2' (≠L2). The electrical lengths L2 and L2' are set within the set range of the electrical length L2 in the first preferred embodiment. The electrical lengths L2 and L2' may be set to be equal to each other (see FIG. 20).

Figure 21:
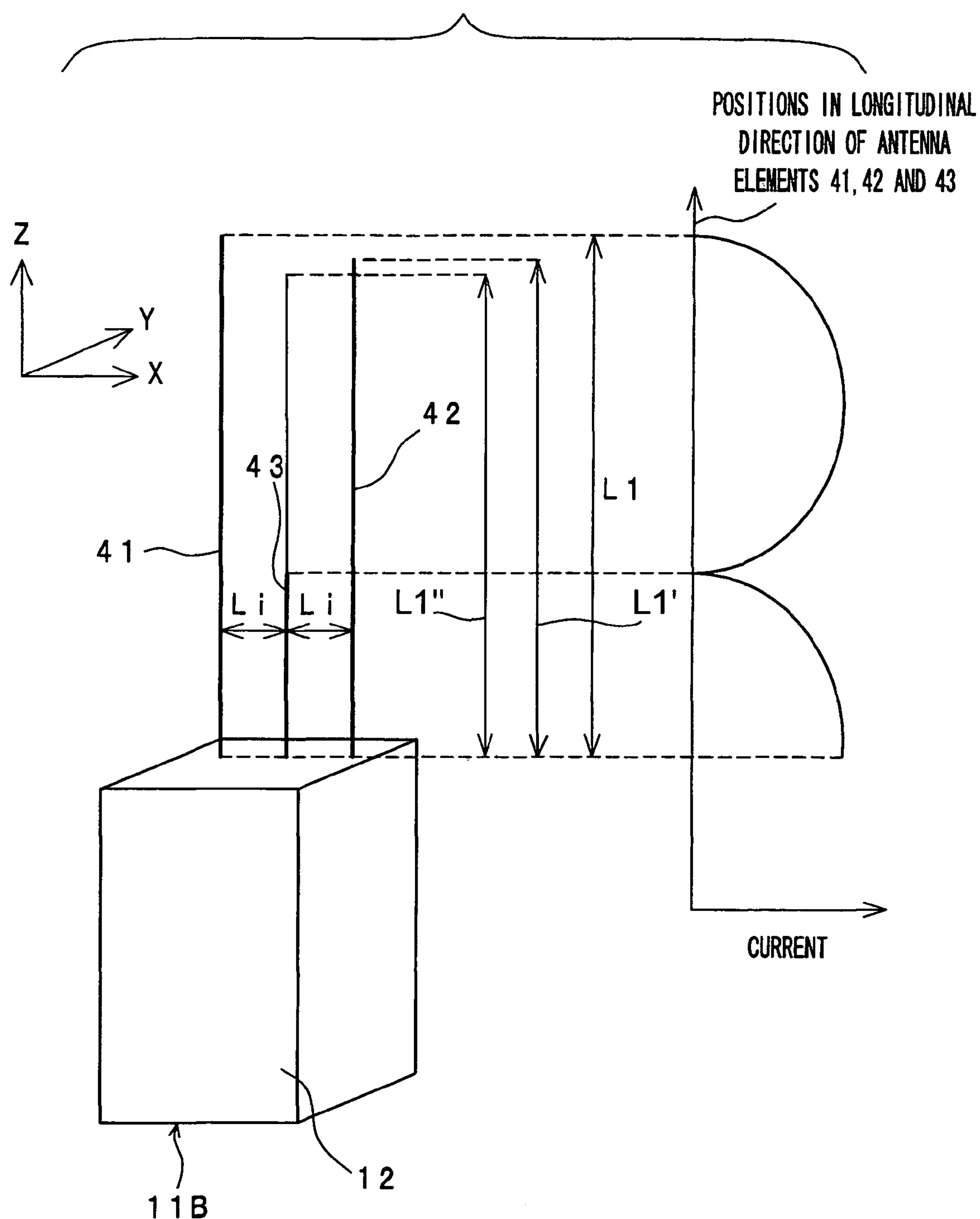
FIG. 21 is a perspective view showing a configuration of a radio communication apparatus 11B including an adaptive antenna apparatus according to a fourth aspect of a fifth preferred embodiment of the present invention and a current distribution with respect to positions in a longitudinal direction of antenna elements 41, 42 and 43.

(III) The electrical length of the antenna element 41 is set to L1, the electrical length of the antenna element 42 is set to L1'(≠L1), and the electrical length of the antenna element 43 is set to L1"(≠L1 and ≠L1'). The electrical lengths L1' and L1" are set within the set range of the electrical length L1 in the first preferred embodiment. The three electrical lengths L1, L1' and L1" may be set in such a manner that at least two of them are different from each other (see FIG. 21).

Although the foregoing preferred embodiment is described referring to the three antenna elements, the present invention is not limited thereto, and four or more antenna elements may be provided.

Although, in the foregoing preferred embodiment, the circuits of two systems are provided, the present invention is not limited thereto. Circuits of three or more systems may be provided.

The foregoing preferred embodiment described the case of selecting the signal having the optimal signal quality level by comparing the respective signal quality levels by the adaptive control with those by the non-adaptive control. However, the present invention is not limited thereto, and the adaptive control method of the different types described earlier may be adopted in place of the foregoing adaptive control method.

INDUSTRIAL APPLICABILITY

As described above in detail, according to one aspect of the present invention, there is provided an adaptive antenna apparatus comprising at least two antenna elements, which includes first and second antenna elements. The first antenna element has an electrical length L1 larger than λ/2 and equal to or smaller than a predetermined upper-limit wavelength, where λ is a wavelength of a radio signal. The second antenna element has an electrical length L2 equal to or larger than a predetermined lower-limit wavelength and equal to or smaller than λ/2. The adaptive antenna apparatus further includes a controller for adaptively controlling the adaptive antenna apparatus to form a radiation pattern of the adaptive antenna apparatus including a plurality of nulls substantively in a direction of an interference wave by adjusting at least one of an amplitude and a phase of each radio signal received by the first and second antenna elements.

According to another aspect of the present invention, there is provided an adaptive antenna apparatus including at least three first antenna elements, and a controller. The first antenna elements respectively have electrical lengths L1, L1' and L1" larger than λ/2 and equal to or smaller than a predetermined upper-limit wavelength, where λ is a wavelength of a radio signal. The controller adaptively controls the adaptive antenna apparatus to form a radiation pattern of the adaptive antenna apparatus including a plurality of nulls substantively in a direction of an interference wave by adjusting at least one of an amplitude and a phase of each radio signal received by the respective first antenna elements. At least two of the electrical lengths L1, L1' and L1" are different from each other.

As mentioned above, according to the present invention, there can be provided an adaptive antenna apparatus having a number of antenna element smaller than that of the prior arts, and being capable of forming a plurality of nulls in a projection pattern, and can be provided a radio communication apparatus using the same adaptive antenna apparatus.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An adaptive antenna apparatus comprising:

N number of antenna elements for receiving radio signals, said antenna elements including at least a first antenna element and a second antenna element, wherein said first antenna element has an electrical length L1 larger than λ/2, where λ is a wavelength of a radio signal, wherein said second antenna element has an electrical length L2 which is different from the electrical length L1 and equal to or smaller than λ/2, and wherein said adaptive antenna apparatus further comprises:

a plurality of A/D converters;

N number of antenna switches, each of said antenna switches being operable to (i) receive a radio signal from a respective antenna element, (ii) connect the respective antenna element to any one of said A/D converters and ground, and (iii) transmit the received radio signal to any one of said A/D converters and ground;

a plurality of output switches, each of said output switches being (i) connected to a respective A/D converter, (ii) operable to receive a radio signal from any of said antenna elements via the respective A/D converter, and (iii) operable to output the radio signal received via the respective A/D converter to a first output when said output switch is in a first position and to a second output when said output switch is in a second position;

an adaptive controller for (i) receiving, from said second outputs of said output switches, each radio signal received by said first and second antenna elements, and (ii) adaptively controlling said adaptive antenna apparatus to form a radiation pattern including a number of nulls substantively in a direction of an interference wave by adjusting at least one of an amplitude and a phase of each radio signal received from said first and second antenna elements, wherein the number of nulls is less than, equal to or greater than N−1 and the degree of freedom of said antenna apparatus is greater than N−1;

a controller for controlling whether each of said output switches is in the first position or the second position; and a demodulator for (i) receiving each radio signal adjusted by said adaptive controller and (ii) receiving, from said first outputs of said output switches, each radio signal received by said first and second antenna elements as unadjusted radio signals.

2. The adaptive antenna apparatus as claimed in claim 1, comprising:

at least two of said first antenna elements respectively having electrical lengths L1 and L1', each larger than λ/2; and said second antenna element, wherein the electrical lengths L1 and L1' are either different from or equal to each other.

3. The adaptive antenna apparatus as claimed in claim 1, comprising:

said first antenna element; and at least two of said second antenna elements respectively having electrical lengths L2 and L2', each equal to or smaller than λ/2, wherein the electrical lengths L2 and L2' are either different from or equal to each other.

4. The adaptive antenna apparatus as claimed in claim 1, wherein the electrical length L2 has a lower-limit wavelength which is one of λ/4, λ/8, and λ/6.

5. The adaptive antenna apparatus as claimed in claim 1, wherein the electrical length L1 has an upper-limit wavelength which is one of 10λ, 3λ, and λ.

6. The adaptive antenna apparatus as claimed in claim 1, wherein said antenna elements are one of an unbalanced antenna and a balanced antenna.

7. The adaptive antenna apparatus as claimed in claim 1, wherein at least one of said antenna elements is a plate-shaped inverted-F antenna.

8. The adaptive antenna apparatus as claimed in claim 1, wherein at least one of said antenna elements forms at least one part of a housing of said adaptive antenna apparatus from an electrically conductive material.

9. The adaptive antenna apparatus as claimed in claim 1, wherein said adaptive controller respectively compares a signal quality level of each radio signal adjusted by said adaptive controller with a signal quality level of each respective unadjusted radio signal-received by said respective antenna elements, thereby controlling said adaptive antenna apparatus to set an optimal signal quality level.

10. An adaptive antenna apparatus comprising:

N number of antenna elements for receiving radio signals, said antenna elements including at least three antenna elements respectively having electrical lengths L1, L1' and L1" larger than λ/2, where λ is a wavelength of a radio signal, wherein at least two of the electrical lengths L1, L1' and L1" are different from each other;

a plurality of A/D converters;

N number of antenna switches, each of said antenna switches being operable to (i) receive a radio signal from a respective antenna element, (ii) connect the respective antenna element to any one of said A/D converters and ground, and (iii) transmit the received radio signal to any one of said A/D converters and ground;

a plurality of output switches, each of said output switches being (i) connected to a respective A/D converter, (ii) operable to receive a radio signal from any of said antenna elements via the respective A/D converter, and (iii) operable to output the radio signal received via the respective A/D converter to a first output when said output switch is in a first position and to a second output when said output switch is in a second position;

an adaptive controller for (i) receiving, from said second outputs of said output switches, each radio signal received by said at least three antenna elements, and (ii) adaptively controlling said adaptive antenna apparatus to form a radiation pattern including a number of nulls substantively in a direction of an interference wave by adjusting at least one of an amplitude and a phase of each radio signal received from said at least three antenna elements, wherein the number of nulls is less than, equal to or greater than N−1 and the degree of freedom of said antenna apparatus is greater than N−1 a controller for controlling whether each of said output switches is in the first position or the second position; and a demodulator for (i) receiving each radio signal adjusted by said adaptive controller and (ii) receiving, from said first outputs of said output switches, each radio signal received by said at least three antenna elements as unadjusted radio signals.

11. The adaptive antenna apparatus as claimed in claim 10, wherein the electrical lengths L1, L1' and L1" have an upper-limit wavelength which is one of 10λ, 3λ, and λ.

12. The adaptive antenna apparatus as claimed in claim 10, wherein each of said antenna elements is one of an unbalanced antenna and a balanced antenna.

13. The adaptive antenna apparatus as claimed in claim 10, wherein at least one of said antenna elements is a plate-shaped inverted-F antenna.

14. The adaptive antenna apparatus as claimed in claim 10, wherein at least one of said antenna elements forms at least one part of a housing of said adaptive antenna apparatus from an electrically conductive material.

15. The adaptive antenna apparatus as claimed in claim 10, wherein said adaptive controller respectively compares a signal quality level of each radio signal adjusted by said adaptive controller with a signal quality level of each respective unadjusted radio signal-received by said respective antenna elements thereby controlling the adaptive antenna apparatus to set an optimal signal quality level.

16. A radio communication apparatus comprising:

an adaptive antenna apparatus; and a radio communication circuit for transmitting and receiving a radio signal received by-said adaptive antenna apparatus, wherein said adaptive antenna apparatus comprises N number of antenna elements for receiving radio signals, said antenna elements including at least a first antenna element and a second antenna element, wherein said first antenna element has an electrical length L1 larger than λ/2, where λ is a wavelength of a radio signal, wherein said second antenna element has an electrical length L2 which is different from the electrical length L1 and equal to or smaller than λ/2, and wherein said adaptive antenna apparatus further comprises:

a plurality of A/D converters;

N number of antenna switches, each of said antenna switches being operable to (i) receive a radio signal from a respective antenna element, (ii) connect the respective antenna element to any one of said A/D converters and ground, and (iii) transmit the received radio signal to any one of said A/D converters and ground;

a plurality of output switches, each of said output switches being (i) connected to a respective A/D converter, (ii) operable to receive a radio signal from any of said antenna elements via the respective A/D converter and (iii) operable to output the radio signal received via the respective A/D converter to a first output when said output switch is in a first position and to a second output when said output switch is in a second position;

an adaptive controller for (i) receiving, from said second outputs of said output switches each radio signal received by said first and second antenna elements, and (ii) for adaptively controlling said adaptive antenna apparatus to form a radiation pattern including a number of nulls substantively in a direction of an interference wave by adjusting at least one of an amplitude and a phase of each radio signal received from said first and second antenna elements, wherein the number of nulls is less than, equal to or greater than N−1 and the degree of freedom of said antenna apparatus is greater than N−1;

a controller for controlling whether each of said output switches is in the first position or the second position; and a demodulator for (i) receiving each radio signal adjusted by said adaptive controller and (ii) receiving, from said first outputs of said output switches, each radio signal received by said first and second antenna elements as unadjusted radio signals.

17. A radio communication apparatus comprising:

an adaptive antenna apparatus; and a radio communication circuit for transmitting and receiving a radio signal received by-said adaptive antenna apparatus, wherein said adaptive antenna apparatus comprises:

N number of antenna elements including at least three antenna elements for receiving radio signals, said at least three antenna elements respectively having electrical lengths L1, L1' and L1", each larger than λ/2, where λ is a wavelength of a radio signal;

a plurality of A/D converters;

N number of antenna switches, each of said antenna switches being operable to (i) receive a radio signal from a respective antenna element, (ii) connect the respective antenna element to any one of said A/D converters and ground, and (iii) transmit the received radio signal to any one of said A/D converters and ground;

a plurality of output switches, each of said output switches being (i) connected to a respective A/D converter, (ii) operable to receive a radio signal from any of said antenna elements via the respective A/D converter, and (iii) operable to output the radio signal received via the respective A/D converter to a first output when said output switch is in a first position and to a second output when said output switch is in a second position;

an adaptive controller for (i) receiving, from said second outputs of said output switches, each radio signal received by said at least three antenna elements, and (ii) adaptively controlling said adaptive antenna apparatus to form a radiation pattern including a number of nulls substantively in a direction of an interference wave by adjusting at least one of an amplitude and a phase of each radio signal received from said at least three antenna elements;

a controller for controlling whether each of said output switches is in the first position or the second position; and a demodulator for (i) receiving each radio signal adjusted by said adaptive controller and (ii) receiving, from said first outputs of said output switches, each radio signal received by said at least three antenna elements as unadjusted radio signals, and wherein at least two of the electrical lengths L1, L1' and L1" are different from each other, wherein the number of nulls is less than, equal to or greater than N−1 and the degree of freedom of said antenna apparatus is greater than N−1.

* * * * *